United States Patent
Nieda

(10) Patent No.: US 10,175,629 B2
(45) Date of Patent: Jan. 8, 2019

(54) DRIVE TRANSMISSION DEVICE AND IMAGE FORMING APPARATUS INCORPORATING THE DRIVE TRANSMISSION DEVICE

(71) Applicant: Hiroaki Nieda, Kanagawa (JP)

(72) Inventor: Hiroaki Nieda, Kanagawa (JP)

(73) Assignee: Ricoh Company, Ltd., Tokyo (JP)

(\*) Notice: Subject to any disclaimer, the term of this patent is extended or adjusted under 35 U.S.C. 154(b) by 67 days.

(21) Appl. No.: 15/368,833

(22) Filed: Dec. 5, 2016

(65) Prior Publication Data

US 2017/0168446 A1  Jun. 15, 2017

(30) Foreign Application Priority Data

Dec. 9, 2015 (JP) ................................ 2015-240657

(51) Int. Cl.
  *G03G 21/16* (2006.01)
  *G03G 15/00* (2006.01)
  (Continued)

(52) U.S. Cl.
  CPC ........... *G03G 15/757* (2013.01); *F16D 1/101* (2013.01); *F16D 3/2052* (2013.01);
  (Continued)

(58) Field of Classification Search
  CPC ............. G03G 15/757; G03G 21/1647; G03G 2221/1657; F16D 1/101; F16D 2001/102; F16D 3/40
  See application file for complete search history.

(56) References Cited

U.S. PATENT DOCUMENTS

2009/0317129 A1\* 12/2009 Abe ..................... G03G 15/757
  399/111
2013/0302066 A1\* 11/2013 Kawai .................... G03G 15/50
  399/167
(Continued)

FOREIGN PATENT DOCUMENTS

JP  2010191027  9/2010
JP  2013195961  9/2013

OTHER PUBLICATIONS

Bearing Editorial Sub-Committee, "Bearing".
(Continued)

*Primary Examiner* — Ruifeng Pu
(74) *Attorney, Agent, or Firm* — Harness, Dickey & Pierce, P.L.C.

(57) ABSTRACT

A drive transmission device, which is included in an image forming apparatus, includes a first drive transmitter having a first hollow body, a second drive transmitter having a second hollow body, a link device, and a releasing device. The link device links the first and second drive transmitters and includes a first inserting body with a projection, a second inserting body with a projection, and a link body. The first and second drive transmitters have respective grooves in the first and second hollow body in an axial direction. The second drive transmitter is disposed at an end portion of a shaft of a rotary body detachably attached to a housing of an image forming apparatus. The releasing device relatively moves the link device to the second drive transmitter in the axial direction and releases a link of the driving force between the rotary body and the image forming apparatus.

13 Claims, 27 Drawing Sheets

(51) Int. Cl.
*F16D 1/10* (2006.01)
*F16D 3/205* (2006.01)

(52) U.S. Cl.
CPC ..... *G03G 21/1647* (2013.01); *G03G 21/1671* (2013.01); *F16D 2001/102* (2013.01); *G03G 2215/0132* (2013.01)

(56) References Cited

U.S. PATENT DOCUMENTS

| | | | | |
|---|---|---|---|---|
| 2013/0322924 A1* | 12/2013 | Kondo | ............... | G03G 15/757 399/167 |
| 2014/0294444 A1* | 10/2014 | Kawai | ............... | G03G 15/757 399/167 |
| 2015/0093150 A1* | 4/2015 | Xiao | ............... | F16D 3/18 399/167 |
| 2016/0252847 A1* | 9/2016 | Sato | ............... | G03G 15/0891 399/167 |
| 2016/0378049 A1* | 12/2016 | Tomita | ............... | G03G 15/757 399/167 |
| 2017/0168446 A1* | 6/2017 | Nieda | ............... | G03G 15/757 |
| 2017/0199490 A1* | 7/2017 | Nieda | ............... | G03G 15/757 |

OTHER PUBLICATIONS

Manabu Hoshino, et al., "Fixed Constant Velocity Joint with Super High Operating Angle of 54 Degrees (TUJ)", NTN Technical Review No. 75 (2007) pp. 16-19.

"Bearing Is Used Here", Bearing, Bearing Editorial Sub-Committee, Japan Bearing Industry Association, Aug. 2008.

* cited by examiner

DRIVE TRANSMISSION DEVICE AND IMAGE FORMING APPARATUS INCORPORATING THE DRIVE TRANSMISSION DEVICE

CROSS-REFERENCE TO RELATED APPLICATION

This patent application is based on and claims priority pursuant to 35 U.S.C. § 119(a) to Japanese Patent Application No. 2015-240657, filed on Dec. 9, 2015, in the Japan Patent Office, the entire disclosure of which is hereby incorporated by reference herein.

BACKGROUND

Technical Field

This disclosure relates to a drive transmission device and an image forming apparatus incorporating the drive transmission device.

Related Art

Known image forming apparatuses include a drive transmission device that transmits a driving force of a drive motor that functions as a drive source to a rotary body such as a photoconductor.

For example, a known drive transmission device includes gears, a link device, a drive side coupling, and a driven side coupling. A driving force is transmitted from a drive motor to one of the gears that functions as a first drive transmitter. The link device drives and links the gear and the drive side coupling that functions as a second drive transmitter. The drive side coupling is engaged with the driven side coupling that functions as a third drive transmitter, and transmits the driving force to the driven side coupling. The link device includes a first inserting body, a second inserting body, and a rod-like linking member. The first inserting body has a spherical shape and is inserted into a hollow body provided in a rotation center of the gear. The second inserting body has a spherical shape and is inserted into a hollow body provided in a rotation center of the drive side coupling. The linking member links the first inserting body and the second inserting body. A drive side projection is formed on the first inserting body to be engaged with a drive side groove that is formed in an inner peripheral surface of the hollow body of the gear and extends in a shaft direction of the gear. Further, a driven side projection is on the second inserting body to be engaged with a driven side groove that is formed in an inner peripheral surface of the hollow body of the drive side coupling and extends in a shaft direction of the hollow body. Further, the known drive transmission device is provided with a coil spring that biases the drive side coupling toward a rotary body side.

When an outer peripheral surface of the spherical first inserting body slides with the inner peripheral surface of the hollow body of the gear and the drive side projection provided on the first inserting body is moved in the shaft direction in the drive side groove, the link device can be inclined with respect to the gear. Further, when an outer peripheral surface of the spherical second inserting body slides with the inner peripheral surface of the hollow body of the drive side coupling, and the driven side projection provided on the second inserting body is moved in the shaft direction in the driven side groove, the link device can be inclined with respect to the drive side coupling member. In a case in which there is misregistration of a rotating shaft center of the rotary body with respect to a rotating shaft center of the gear (hereinafter, the misregistration is referred to as a shaft center gap), the link device is inclined with respect to the shaft direction, so that a rotating shaft center of the drive side coupling can be adjusted to a rotating shaft center of the driven side coupling (the rotating shaft center of the rotary body), and the drive side coupling can be engaged with the driven side coupling. Further, an angular speed variation according to an inclination angle of the link device with respect to the gear, the angular speed variation having been caused between the gear and the link device, can be offset with an angular speed variation according to an inclination angle of the link device with respect to the drive side coupling, the angular speed variation being caused between the link device and the drive side coupling, and the rotary body can be rotated at a constant angular speed.

The known transmission device moves the drive side coupling to the gear side against the biasing force of the coil spring. Consequently, the drive side coupling and the driven side coupling are disengaged from each other, and therefore the link of driving of the housing side and the rotary body side is released. With this configuration, the above-described drive transmission device is preferably used in the image forming apparatus.

SUMMARY

At least one aspect of this disclosure provides a drive transmission device including a first drive transmitter, a second drive transmitter, a link device, and a releasing device. The first drive transmitter has a first hollow body in a rotation center. The second drive transmitter has a second hollow body in a rotation center. The link device is configured to link the first drive transmitter and the second drive transmitter and include a first inserting body, a second inserting body, and a link body. The first inserting body has a spherical shape and a peripheral surface on which a projection protruding in a radial direction is formed. The first inserting body is configured to be inserted into the first hollow body of the first drive transmitter. The second inserting body has a spherical shape and a peripheral surface on which a projection protruding in a radial direction is formed. The second inserting body is configured to be inserted into the second hollow body of the second drive transmitter. The link body is configured to link the first inserting body and the second inserting body. The first drive transmitter has a groove formed in an inner peripheral surface of the first hollow body in which the projection of the first inserting body of the link device moves in an axial direction. The second drive transmitter has a groove formed in an inner peripheral surface of the second hollow body in which the projection of the second inserting body of the link device moves in an axial direction. The second drive transmitter is disposed at an end portion of a shaft of a rotary body detachably attached to a housing of an image forming apparatus. The releasing device is configured to relatively move the link device to the second drive transmitter in the axial direction and release a link of the driving force between the rotary body and the housing.

Further, at least one aspect of this disclosure provides an image forming apparatus including a rotary body having a shaft, and the above-described drive transmission device configured to transmit a driving force generated by a drive motor to the rotary body.

DETAILED DESCRIPTION

Figure 1:
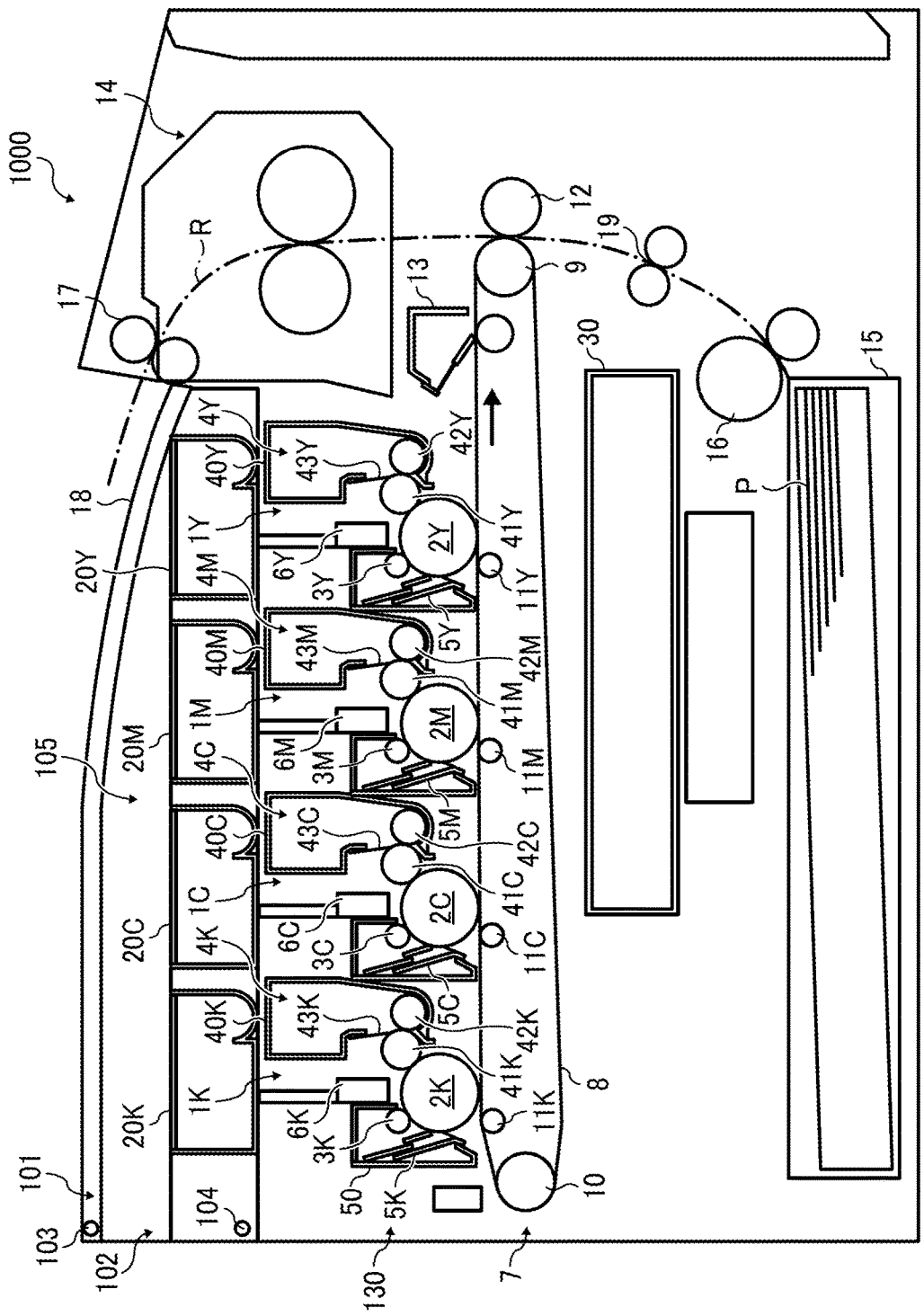
FIG. 1 is a schematic configuration diagram illustrating a general arrangement of an image forming apparatus according to an embodiment of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

A description is given of a configuration of an electrophotographic image forming apparatus for forming an image, according to the present embodiment of this disclosure.

A description is given of a basic configuration of the image forming apparatus 1000 according to an embodiment of this disclosure.

It is to be noted that identical parts are given identical reference numerals and redundant descriptions are summarized or omitted accordingly.

The image forming apparatus 1000 may be a copier, a facsimile machine, a printer, a multifunction peripheral or a multifunction printer (MFP) having at least one of copying, printing, scanning, facsimile, and plotter functions, or the like. According to the present embodiment, the image forming apparatus 1000 is an electrophotographic printer that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

Hereinafter, a color laser printer according to an embodiment of this disclosure is described as an image forming apparatus in an electrophotography system, to which the present invention is applied.

FIG. 1 is a schematic configuration diagram illustrating general arrangement of the image forming apparatus 1000 according to the present embodiment.

As illustrated in FIG. 1, four process units 1Y, 1M, 1C, and 1K are detachably attached to a housing 100 of the image forming apparatus 1000. The process units 1Y, 1M, 1C, and 1K have a basically identical configuration to each other, except that these process units accommodate toners of different colors of yellow (Y), magenta (M), cyan (C), and black (K) corresponding to color separation components of a color image. It is to be noted that in the drawings, the same or corresponding portions are denoted with the same reference sign, and overlapping description is appropriately omitted.

To be specific, each of the process units 1Y, 1M, 1C, and 1K includes a drum-like photoconductor 2 (i.e., photoconductors 2Y, 2M, 2C, and 2K) as an image bearer. Each of the process units 1Y, 1M, 1C, and 1K includes a charging roller 3 (i.e., charging rollers 3Y, 3M, 3C, and 3K) which charges a surface of the photoconductor 2, a developing unit 4 (i.e., developing units 4Y, 4M, 4C, and 4K) as a developing device that makes a latent image on the photoconductor 2 visible, a cleaning blade 5 (i.e., cleaning blade 5Y, 5M, 5C, and 5K) which cleans the surface of the photoconductor 2, and the like around the photoconductor 2. In the present embodiment, each of the process units 1Y, 1M, 1C, and 1K is made of two large modules including a photoconductor unit 50 including the photoconductor 2, the charging roller 3, the cleaning blade 5, and the like, and the developing unit 4. The process units 1Y, 1M, 1C, and 1K have respective configurations identical to each other except the colors of toners, and therefore are occasionally described without suffixes indicating the toner colors, which are Y, M, C, and K.

The developing unit 4 serves as a consumable container that accommodates a toner as a consumable for image formation in a developing case 40. The developing unit 4 according to the present embodiment includes a developing roller 41 that bears the toner, a supply roller 42 that supplies the toner to the developing roller 41, a regulating blade 43 that regulates the thickness of the toner born on the developing roller 41, and the like. The developing roller 41 is arranged to face the photoconductor 2 to expose a part through an opening portion of the developing case 40, and forms a developing area. Further, the developing unit 4 includes toner residual amount detection means that detects a toner residual amount in the developing case 40.

An exposure device 6 as latent image formation means that forms a latent image on the surface of the photoconductor 2 is provided in a position facing each of the photoconductors 2. In the present embodiment, a light emitting diode (LED) unit is used as the exposure device 6.

A toner cartridge 20 serving as the consumable container that accommodates a toner as a consumable for image formation is detachably attached above each of the developing units 4. A toner of the same color as the toner in the corresponding developing unit 4 is accommodated in each of the toner cartridges 20, and when the toner in the developing unit 4 (developing case 40) falls below a predetermined amount, the toner is supplied from the toner cartridge 20. It is to be noted that, in the present embodiment, a one-component developer made of a toner is used as the consumable (powder) for image formation. However, the configuration is not limited thereto, and the present embodiment can be applied to a configuration using a two-component developer made of a toner and a carrier.

A transfer device 7 is arranged below the photoconductors 2. The transfer device 7 includes an intermediate transfer belt 8 made of an endless belt. The intermediate transfer belt 8 is stretched over a drive roller 9 and a driven roller 10, and the intermediate transfer belt 8 goes around and travels (is rotated) in a direction illustrated by the arrow in FIG. 1 as the drive roller 9 is rotated in a counterclockwise manner in FIG. 1.

A primary transfer roller 11 is arranged in a position facing each of the photoconductors 2. Each of the primary transfer rollers 11 presses an inner peripheral surface of the intermediate transfer belt 8 in each position, and a primary transfer nip is formed in a place where a pressed portion of the intermediate transfer belt 8 and each of the photoconductors 2 come in contact with each other. A predetermined direct current voltage (DC) and/or a predetermined alternating current voltage (AC) are applied to each of the primary transfer rollers 11.

Further, a secondary transfer roller 12 is arranged in a position facing the drive roller 9. The secondary transfer roller 12 presses an outer periphery surface of the intermediate transfer belt 8, and a secondary transfer nip is formed in a place where the secondary transfer roller 12 and the intermediate transfer belt 8 come in contact with each other. Further, similarly to the primary transfer roller 11, a predetermined direct current voltage (DC) and/or a predetermined alternating current voltage (AC) are applied to the secondary transfer roller 12. Further, a belt cleaning device 13 that cleans a surface of the intermediate transfer belt 8 is arranged on an outer peripheral surface of the intermediate transfer belt 8 on a right end side in FIG. 1.

A waste toner container as a consumable container in which a waste toner removed with the cleaning blade 5 and in the belt cleaning device is accommodated is provided below the transfer device 7. A toner discharge port of the photoconductor unit 50 including the cleaning blade 5 and a toner accepting port of the waste toner container 30 are connected with a waste toner transport hose. Further, the belt cleaning device 13 and the toner accepting port of the waste toner container 30 are connected with a waste toner transport hose.

A sheet feeding tray 15 that accommodates a sheet P as a recording medium, a sheet feeding roller 16 that feeds the sheet P from the sheet feeding tray 15, and the like are provided in a lower portion of the housing 100. Here, the sheet P includes a cardboard, a postcard, an envelope, a plain paper, a thin paper, coated papers (a coated paper and an art paper), a tracing paper, and the like. Further, as the recording medium, an overhead projector (OHP) sheet or an OHP film can be used.

A pair of sheet ejection rollers 17 for discharging the sheet outside, and a sheet ejection tray 18 for stocking the sheet discharged by the sheet ejection rollers 17 are provided in an upper portion of the housing 100.

Further, a conveying path R for conveying the sheet P from the sheet feeding tray 15 to the sheet ejection tray 18 through the secondary transfer nip is arranged in the housing 100. In the conveying path R, a pair of registration rollers 19 as timing rollers that time conveyance timing and convey the sheet to the secondary transfer nip is provided upstream of the position of the secondary transfer roller 12 in a sheet conveyance direction. Further, a fixing device 14 that fixes an image to the sheet is provided downstream of the position of the secondary transfer roller 12 in the sheet conveyance direction.

Next, a basic operation of the image forming apparatus 1000 according to the present embodiment will be described with reference to FIG. 1. When an image formation operation is started, the photoconductors 2 of the process units 1Y, 1M, 1C, and 1K are driven and rotated in a clockwise manner of FIG. 1, and the surfaces of the photoconductors 2 are uniformly charged to a predetermined polarity by the charging rollers 3. Charging surfaces of the photoconductors 2 are irradiated with laser light from the exposure devices 6, on the basis of image information of a document read by an image reading device or image information input from an external device, and electrostatic latent images are formed on the surfaces of the photoconductors 2. At this time, the image information exposed on the photoconductors 2 is image information of single colors obtained by separating a desired full color image into color information of yellow, magenta, cyan, and black.

The toners are supplied by the developing units 4 to the electrostatic latent images formed on the photoconductors 2 in this way, so that the electrostatic latent images are made visible as toner images. To be specific, the toner in the developing case 40 is friction charged by rubbing between the supply roller 42 and the developing roller 41, and is supplied to the surface of the developing roller 41. The toner born on the developing roller 41 is friction charged at the same time when the thickness of the toner layer is regulated, by passing through the regulation nip of the regulating blade 43. Then, when the toner on the developing roller 41 is conveyed to the opposed position (developing area) to the photoconductor 2, the toner is transferred to the electrostatic latent image on the photoconductor 2 by force of an electric field caused between the photoconductor 2 and the developing roller 41, so that the toner image is formed. When the toner residual amount detection means detects that the toner residual amount in the developing unit 4 (developing case 40) falls below a certain threshold, a fixed amount of toner is supplied by the toner cartridge 20.

Further, when the image formation operation is started, the drive roller 9 over which the intermediate transfer belt 8 is stretched is driven and rotated, so that the intermediate transfer belt 8 goes around and travels in the arrow direction in FIG. 1. Further, a constant voltage in an opposite polarity to charging polarity of the toner or a voltage with controlled constant current is applied to each of the primary transfer rollers 11, so that a transfer electric field is formed in the primary transfer portion between each of the primary transfer rollers 11 and each of the photoconductors 2Y, 2M, 2C, and 2K.

After that, when the toner images in respective colors on the photoconductors 2 reach the primary transfer portions with the rotation of the photoconductors 2, the toner images on the photoconductors 2 are sequentially transferred and superimposed on the intermediate transfer belt 8 by the transfer electric fields formed in the primary transfer portions. Therefore, a full-color toner image is born on the surface of the intermediate transfer belt 8. Further, the toner on the photoconductor 2, which has not been able to be transferred to the intermediate transfer belt 8, is removed by the cleaning blade 5, and the removed toner is conveyed to and collected in the waste toner container 30.

The sheet feeding roller 16 starts to be driven and rotate, and the sheet P is sent from the sheet feeding tray 15 to the conveying path R in the lower portion of the housing 100. Conveyance of the sheet P sent to the conveying path R is temporarily stopped by the registration roller 19.

After that, the registration roller 19 starts to be driven and rotate at predetermined timing, and conveys the sheet P to a secondary transfer portion in accordance with timing when the toner image on the intermediate transfer belt 8 reaches the secondary transfer portion. At this time, a transfer voltage in an opposite polarity to toner charging polarity of the toner image on the intermediate transfer belt 8 is applied to the secondary transfer roller 12, and a transfer electric field is formed in the secondary transfer portion, accordingly. Then, the toner image on the intermediate transfer belt 8 is collectively transferred onto the sheet P by the transfer electric field. Further, the residual toner on the intermediate transfer belt 8, which has not been able to be transferred to the sheet P, is removed by the belt cleaning device 13, and the removed toner is conveyed to and collected in the waste toner container 30.

Following that, the sheet P on which the toner image has been transferred is conveyed to the fixing device 14, and the toner image on the sheet P is fixed to the sheet P in the fixing device 14. Then, the sheet P is discharged outside the apparatus by the pair of sheet ejection rollers 17, and is stocked on the sheet ejection tray 18.

The above description is the image formation operation of when a full-color image is formed on a sheet. However, the image formation operation is not limited to the embodiment, a single-color image can be formed using any one of the four process units 1Y, 1M, 1C, and 1K, or a two-color or three-color image can be formed using two or three process units.

Figure 2:
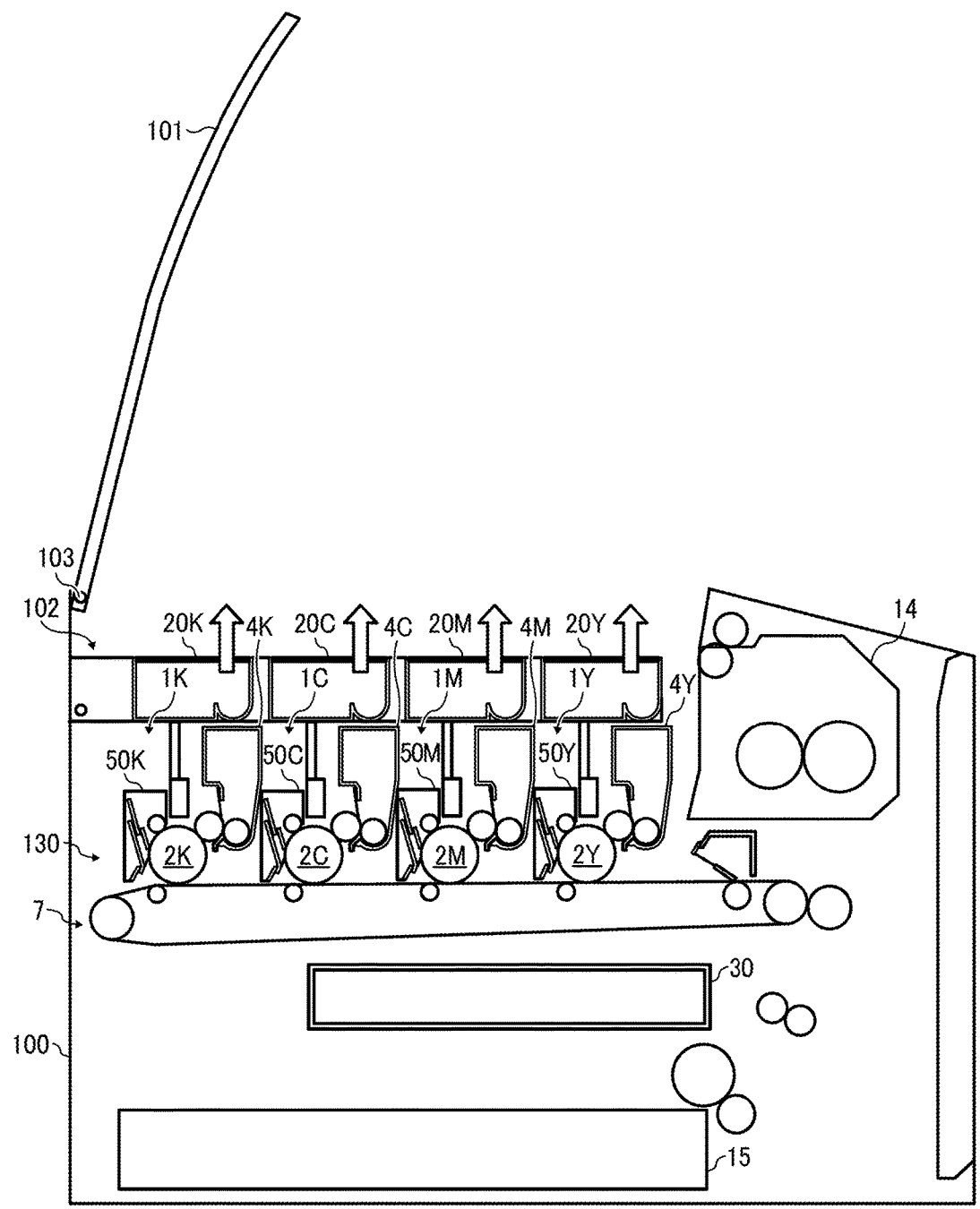
FIG. 2 is a configuration diagram illustrating a state in which an upper cover of a housing of the image forming apparatus of FIG. 1 is open.
Figure 3:
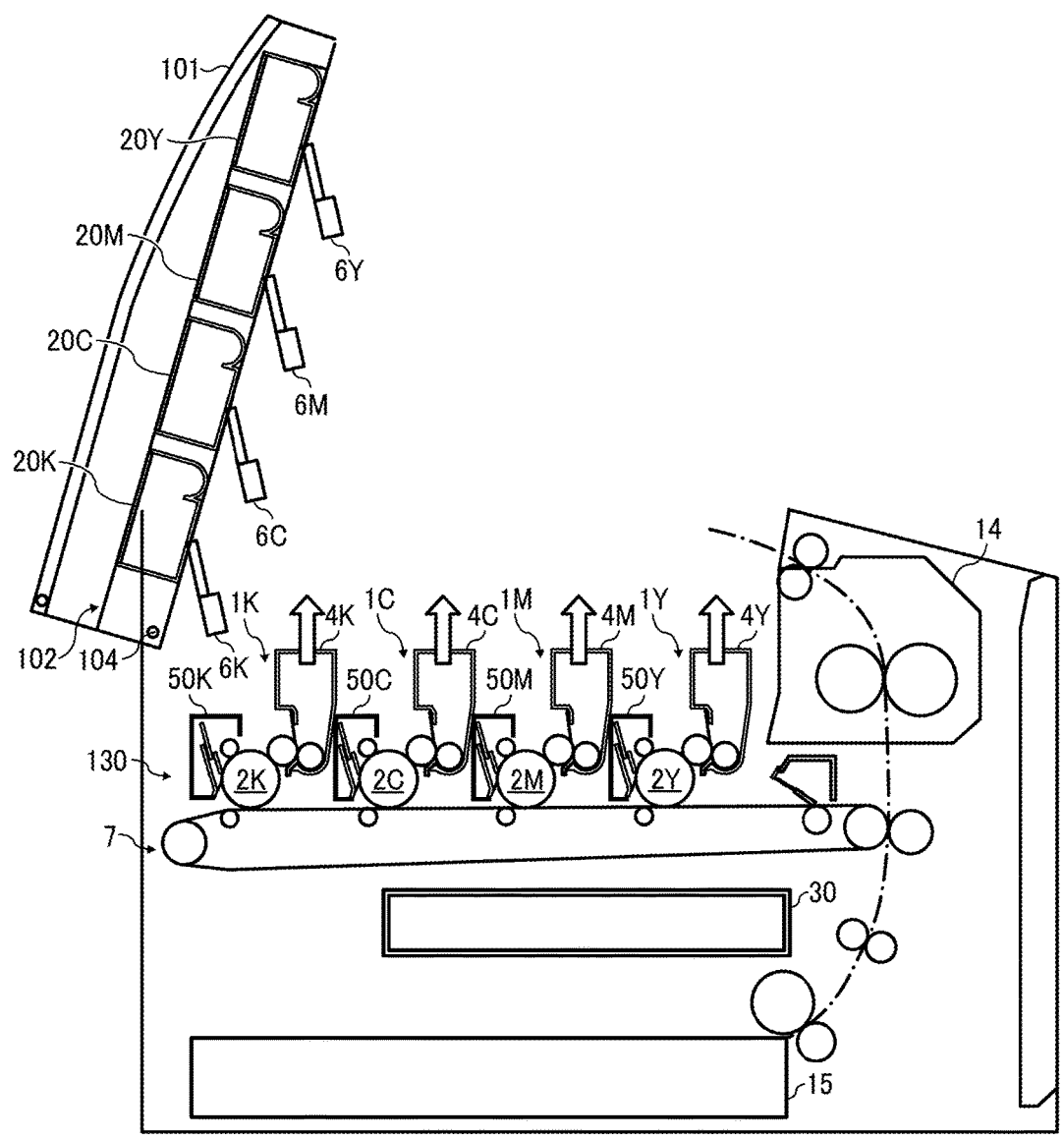
FIG. 3 is a configuration diagram illustrating a state in which an intermediate cover of the housing of the image forming apparatus of FIG. 1 is open.

Further, as illustrated in FIG. 1, the image forming apparatus 1000 according to the present embodiment includes an upper cover 101 provided in an upper portion of the housing 100, and an intermediate cover 102 provided at an inner side of (below) the upper cover 101. The upper cover 101 and the intermediate cover 102 are made openable/closable by being revolved using support shafts 103 and 104 provided in the housing 100, respectively. FIG. 2 is a configuration diagram illustrating a state in which the upper cover 101 is opened, and FIG. 3 is a configuration diagram illustrating a state in which the intermediate cover 102 is further opened.

A toner container attaching portion 105 to which the plurality of toner cartridges 20 is attachable is formed in the intermediate cover 102. As illustrated in FIG. 2, when the upper cover 101 remains opened, the toner cartridges 20 can be attachable to and detachable from the intermediate cover 102 from above.

The process units 1Y, 1M, 1C, and 1K of the respective colors can be accommodated in a unit attaching portion 130 formed at an inner side of (below) the intermediate cover 102. As illustrated in FIG. 3, when the intermediate cover 102 remains opened, the toner cartridges 20 can be integrally retracted from above the process units 1Y, 1M, 1C, and 1K. Further, at this time, the exposure devices 6 are retracted from above the photoconductors 2, together with the intermediate cover 102, and thus the process units 1Y, 1M, 1C, and 1K (the developing unit 4 and the photoconductor unit 50) can be attachable to and detachable from above. As described above, in the present embodiment, the process units 1Y, 1M, 1C, and 1K can be attached and detached without removing the toner cartridges 20 from the intermediate cover 102, and the present embodiment has excellent replacement workability.

Figure 4:
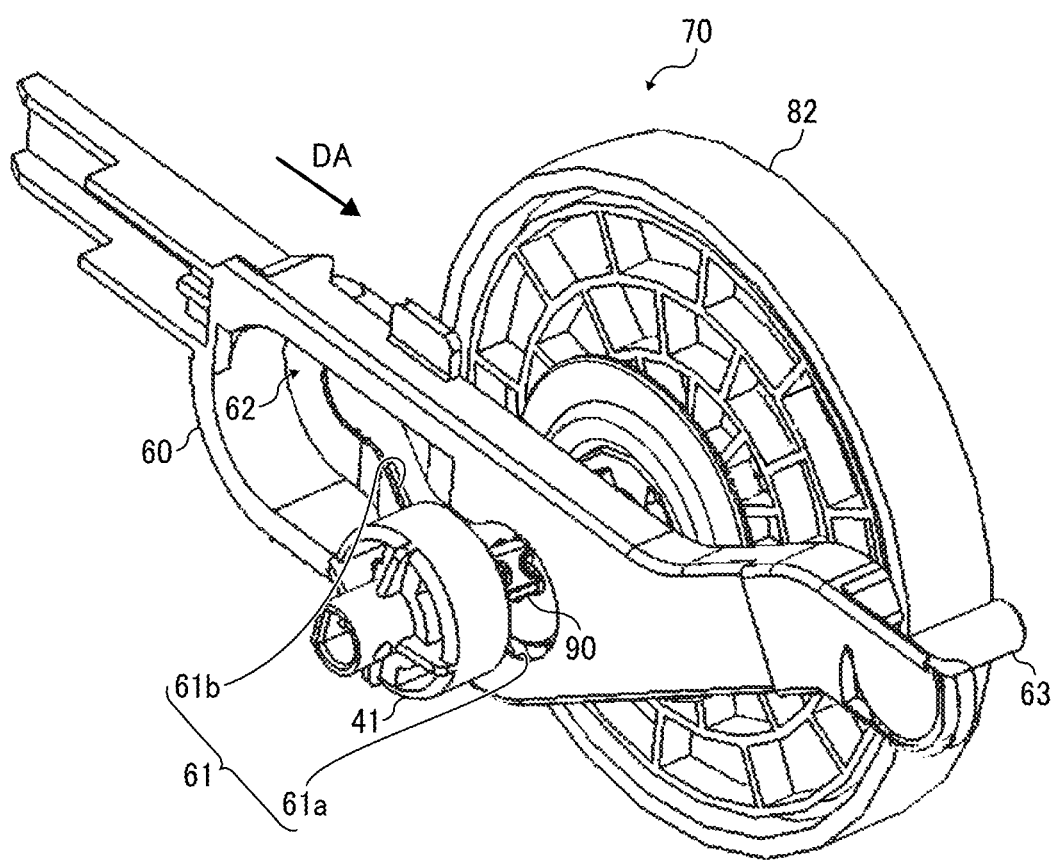
FIG. 4 is a perspective view of a drive transmission device according to an embodiment of this disclosure.
Figure 5:
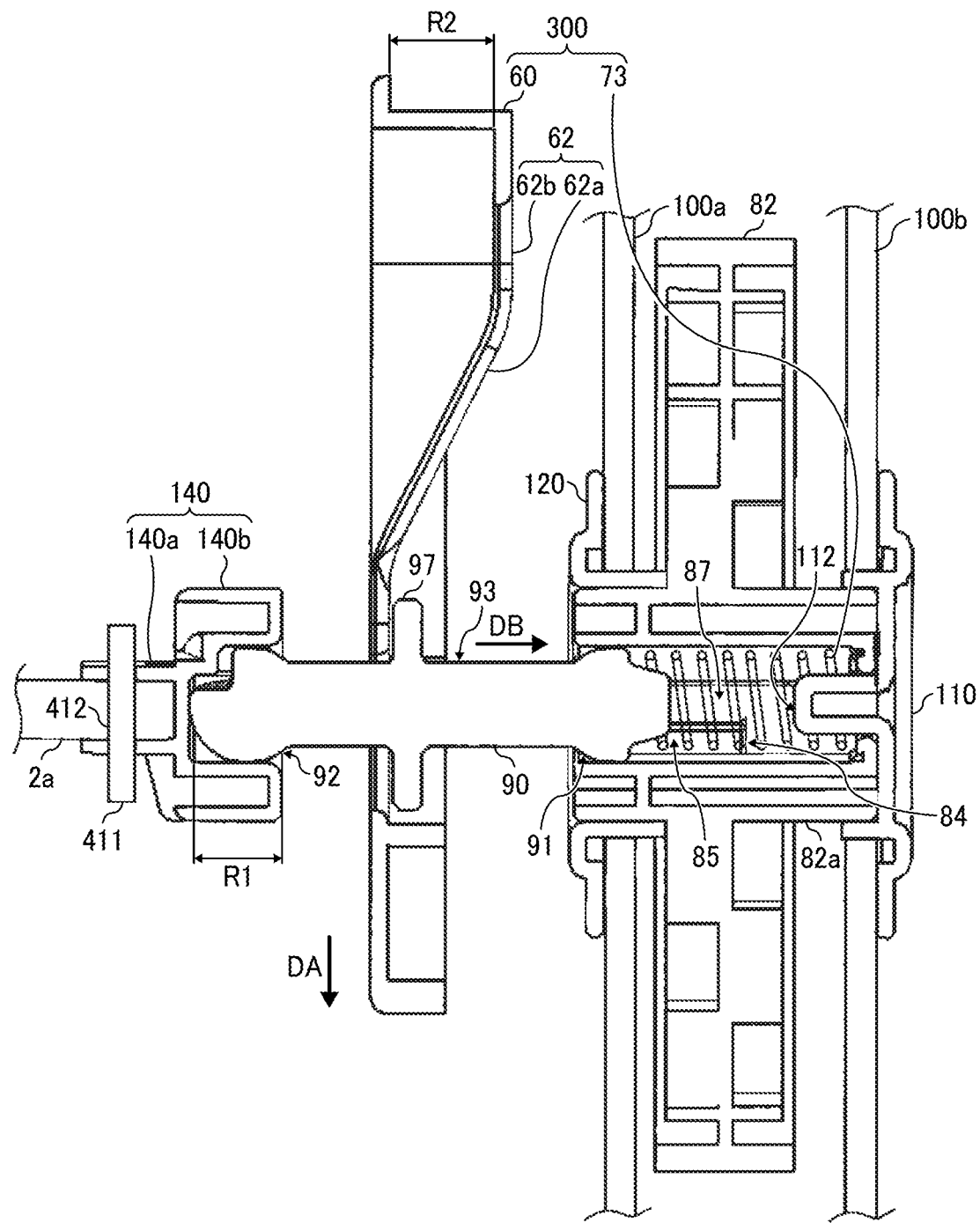
FIG. 5 is a cross-sectional view of the drive transmission device according to an embodiment of this disclosure.
Figure 6:
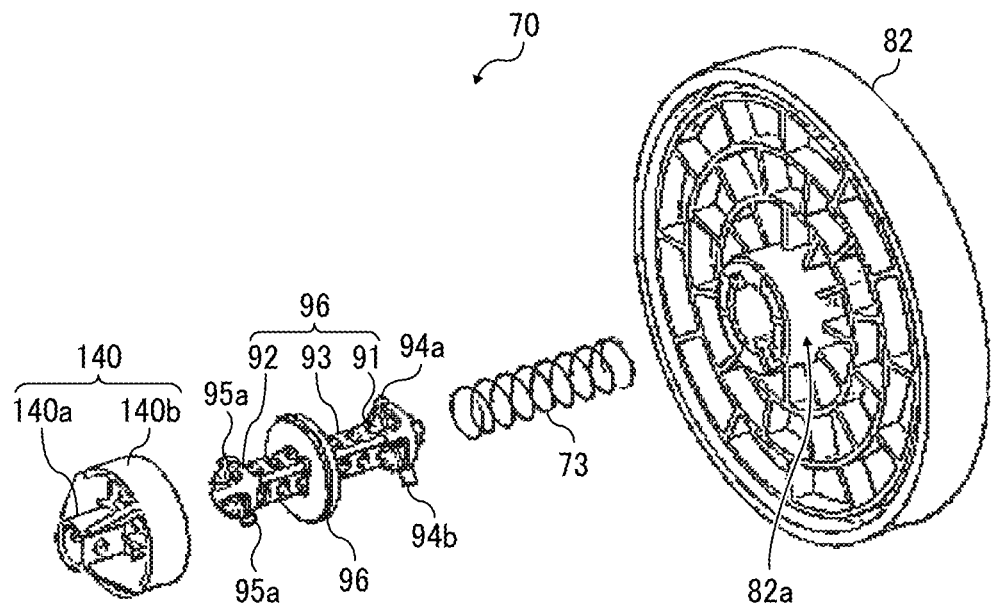
FIG. 6 is an exploded perspective view of the drive transmission device according to an embodiment of this disclosure, from which a releasing member is removed.

FIG. 4 is a perspective view of a drive transmission device 70. FIG. 5 is a cross-sectional view of the drive transmission device 70. FIG. 6 is an exploded perspective view of the drive transmission device 70 from which a releasing member 60 is removed.

The drive transmission device 70 includes a photoconductor gear 82 as a first drive transmitter to which driving force is transmitted from a drive motor, a coupling member 140 as a second drive transmitter attached to an end portion of a shaft 2a of the photoconductor, a link device 90 that drives and links the photoconductor gear 82 and the coupling member 140, a coil spring 73 that biases the link device 90 attached to the photoconductor gear 82 toward the coupling member side, and the like. Further, the drive transmission device 70 includes the releasing member 60 that releases the drive link between the link device 90 and the coupling member 140.

A driving side cylindrical portion 82a into which a driving side spherical portion 91 of the link device 90 is inserted is included in a rotation center of the photoconductor gear 82. The coupling member 140 includes a cylindrical shaft inserting portion 140a into which a tip end portion of the photoconductor shaft 2a is inserted, and a driven side cylindrical portion 140b to which a driven side spherical portion 92 of the link device 90 is inserted. A through hole 412 that a parallel pin 411 penetrates is provided in the shaft inserting portion 140a, the parallel pin 411 being provided to the photoconductor shaft 2a.

As illustrated in FIG. 5, the driving side cylindrical portion 82a of the photoconductor gear 82 is rotatably supported by a front side bearing 120 fit and secured to an opening portion of a partition 100a, and a far side bearing 110 fit and secured to an opening portion of a far side plate 100b. Accordingly, the photoconductor gear 82 is rotatably supported by the far side plate 100b and the partition 100a through bearings 110 and 120.

The link device 90 includes the driving side spherical portion 91 as a first inserting body, the driven side spherical portion 92 as a second inserting body, and a linking member 93 that links the driving side spherical portion 91 and the driven side spherical portion 92. Further, two driven side projections 95a protruding from a surface in a radial direction are provided on the driven side spherical portion 92 at an interval of 180° in a rotating direction. Further, a first drive side projection 94a protruding from a surface in the radial direction is provided on the driving side spherical portion 91. Further, a second drive side projection 94b is provided at an interval of 180 degrees in the rotating direction from the first drive side projection 94a. Further, a disc shaped pressing target portion 97 to be pressed toward the photoconductor gear 82 side by the releasing member 60 is included in the linking member 93.

The releasing member 60 is slidably provided in the housing 100 in a direction of the arrow DA illustrated in FIGS. 4 and 5, and a lever attaching portion 63 to which a releasing lever for causing the releasing member to slide is provided in one end of the releasing member 60, as illustrated in FIG. 4.

The releasing member 60 is slidably provided in the housing 100 in a direction of the arrow DA illustrated in FIGS. 4 and 5, and a lever attaching portion 63 to which a releasing lever for causing the releasing member to slide is provided in one end of the releasing member 60, as illustrated in FIG. 4.

Further, the releasing member 60 includes a pressing portion 62 having the other end side depressed toward the photoconductor gear 82 side and which presses the pressing target portion 97 of the link device 90 toward the photoconductor gear 82 side. The pressing portion 62 includes an inclined face portion 62a inclined to be positioned toward the photoconductor gear 82 side as away from the attaching opening portion 61a, and a flat face portion 62b perpendicular to the shaft direction. A depth R2 of the depression of the flat face portion 62b toward the photoconductor gear 82 side is larger than a length $R_1$ of the driven side cylindrical portion 140b of the coupling member 140.

Figure 7:
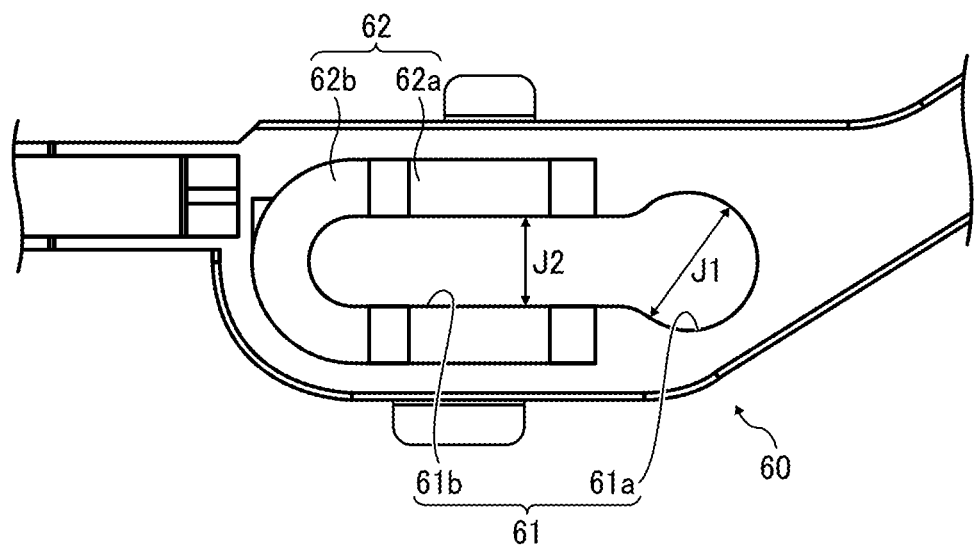
FIG. 7 is a principal portion enlarged view of the releasing member according to an embodiment of this disclosure.

FIG. 7 is a principal portion enlarged view of the releasing member 60.

As illustrated in FIG. 7, an inner diameter J1 of the attaching opening portion 61a is larger than an outer diameter of the driven side spherical portion 92 of the link device 90. Further, a short direction length J2 of the moving opening portion 61b is smaller than an outer diameter of the linking member 93 of the link device 90, and is larger than an outer diameter of the pressing target portion 97.

Figure 8:
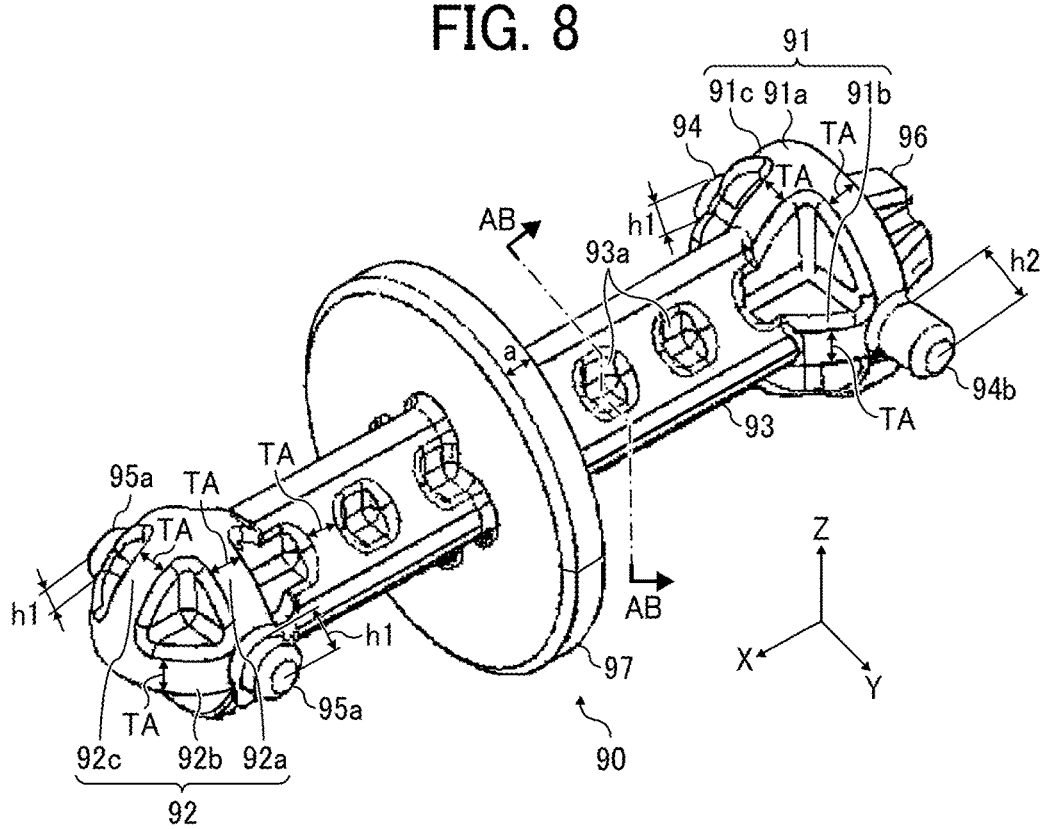
FIG. 8 is a perspective view of a link device according to an embodiment of this disclosure.
Figure 9:
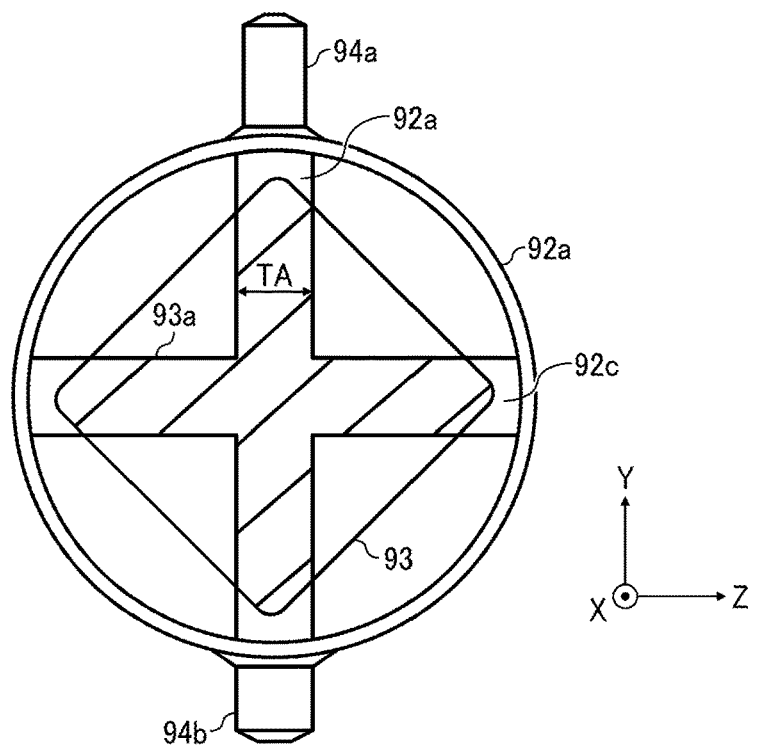
FIG. 9 is an AB-AB cross-sectional view of FIG. 8 according to an embodiment of this disclosure.

FIG. 8 is a perspective view of the link device 90, and FIG. 9 is an A-A cross-sectional view of FIG. 8.

The description below will be given, where a shaft direction is an X direction, a protruding direction of the drive side projection and the driven side projection is a Y direction, and a direction perpendicular to the X direction and the Y direction is a Z direction.

The link device 90 is a resin molded item, and the driving side spherical portion 91, the driven side spherical portion 92, the linking member 93, the drive side projections 94a and 94b, and the driven side projections 95a are an integrated object made of resin material. As the resin used for formation of the link device 90, a polyacetal resin (POM) having excellent mechanical strength and favorable wear resistance and slidability can be favorably used.

The drive side projections 94a and 94b have a columnar shape, and are provided in intersecting places of a first drive side large circle 91a and a second drive side large circle 91b. A height h2 of the second drive side projection 94b is smaller than a height h1 of the driven side projections 95a and the first drive side projection 94a. In the present embodiment, the driving side spherical portion 91 has a lightened hemisphere shape. However, the shape may be appropriately determined according to a maximum inclination angle of the link device 90. Further, a spring 96 is provided in a rotation center of the driving side spherical portion 91.

The driven side projections 95a also have a columnar shape, and are provided in intersecting places of a first driven side large circle 92a and a second driven side large circle 92b. A third driven side large circle 92c of the driven side spherical portion 92 on the coupling member side with respect to the first driven side large circle 92a is formed only in one direction side (the left side in FIG. 8) of the Z direction with respect to the second driven side large circle 92b, and has a shape cut in the other side of the Z direction.

Since the link device 90 is molded by injection molding or the like, sink marks are caused and the spherical portions 91 and 92 and the linking member 93 are deformed due to the sink marks, and the deformation may affect the quality. Therefore, in the present embodiment, the spherical portions 91 and 92, and the linking member 93 are lightened, and occurrence of the sink marks is restrained.

The driving side spherical portion 91 has a hemisphere shape that is lightened, leaving the first drive side large circle 91a as a spherical large circle perpendicular to the X direction, the second drive side large circle 91b as a spherical large circle perpendicular to the Z direction, and a third drive side large circle 91c as a spherical large circle perpendicular to the Y direction. Further, the driven side spherical portion 92 has a spherical shape lightened, leaving the first driven side large circle 92a as a spherical large circle perpendicular to the X direction, a second driven side large circle 92b as a spherical large circle perpendicular to the Z direction, and the third driven side large circle 92c as a spherical large circle perpendicular to the Y direction. It is to be noted that the large circle refers to a circle made such that a plane, which passes through the center of a sphere, intersects with a spherical surface.

Further, the linking member 93 has an approximately square pole shape, and a plurality of lightening portions 93a formed by lightening side surfaces of the linking member 93 is provided at intervals a in the X direction in FIG. 8. As illustrated in FIG. 9, the lightening portion 93a is lightened, leaving a linear portion extending in the Y direction and a linear portion extending in the Z direction in FIG. 9, and has a cross shape in cross section. Further, the linking member 93 is formed to have the side surfaces inclined by an angle of 45 degrees with respect to the Y direction. As described above, by forming the side surfaces to be inclined by an angle of 45 degrees with respect to the Y direction, the linear portions of the lightening portion 93a become diagonal lines of a square, and the linear portions of the lightening portion 93a can be made longer than a case where the side surfaces of the linking member 93 are formed to become planes parallel to a plane perpendicular to the Y direction.

Accordingly, a decrease in strength of the linking member 93 due to the lightening can be restrained.

Figure 10A:
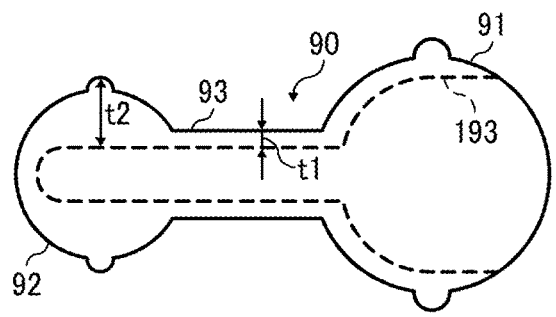
FIGS. 10A through 10C are diagrams illustrating a comparative example of lightening of a link device.
Figure 10B:
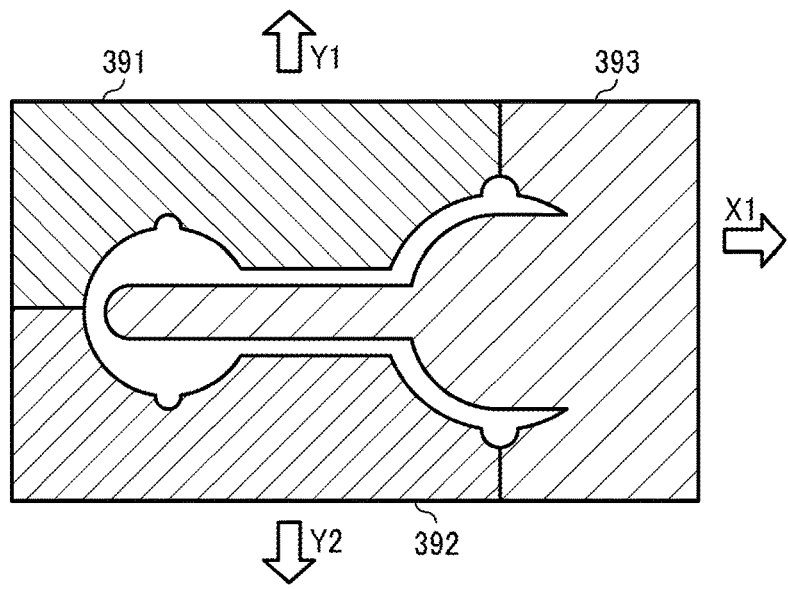
Figure 10C:
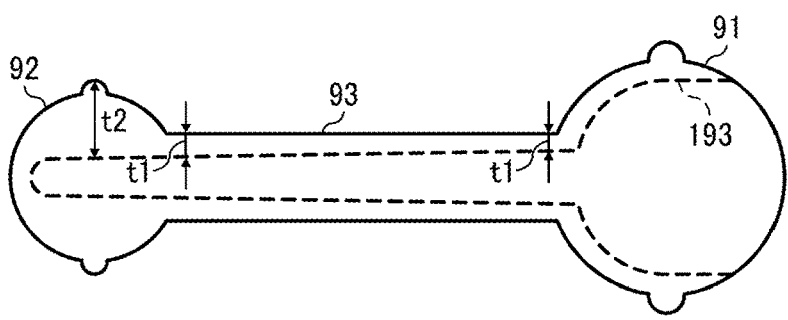

FIGS. 10A, 10B, and 10C are diagrams illustrating a comparative example of lightening of a link device 90.

In a known transmission device, the drive side coupling that functions as a second drive transmitter is movable in the axial direction. Therefore, by moving the drive side coupling to the gear side against the biasing force of the coil spring, the drive side coupling and the driven side coupling are disengaged from each other with the rotary body being attached to the housing of the image forming apparatus, so that the link of driving of the housing side and the rotary body side is released. According to this configuration, the above-described drive transmission device is preferably used in the image forming apparatus where the rotary body is detachably attached in a direction perpendicular to a direction of the shaft of the rotary body. That is, when the rotary body is removed from the housing, the drive side coupling is shifted to the gear side to disengage from the driven side coupling, thereby removing the rotary body in a direction perpendicular to the axial direction of the rotary body (i.e., the photoconductor).

However, this drive transmission device includes multiple parts and components, and therefore can lead to an increase in costs.

As illustrated in FIG. 10A, in a case of restraining the thickness of a link device 90 to restrain sink marks by providing a lightening portion 193 having a hole shape with a driving side spherical portion 91 side open to the link device 90, a mold structure becomes the one illustrated in FIG. 10B. That is, the mold structure includes a first mold 391 that is moved in a Y1 direction, a second mold 392 that is moved in a Y2 direction, and a third mold 393 that is moved in an X1 direction. In such lightening, the third mold 393, which forms the lightening portion 193 having a hole shape long in the shaft direction, needs to be moved in the X1 direction in a large manner to pull out the third mold 393 from the molded link device 90. Further, the portion of the third mold 393, where the lightening portion 193 having a hole shape is formed, requires at least φ 8 mm in terms of strength and the like, and achievement of downsizing of the link device 90 is difficult Further, the comparative structure provided with the lightening portion 193 having a hole shape has a thickness t1 of the linking member 93 and a thickness t2 of different portions of the driven side spherical portion 92. In the comparative structure, the lightening portion 193 needs to have a shape with a diameter gradually larger toward the drive side in order to favorably pull out the third mold 393 from the molded link device 90. As a result, in a case where the link device 90 has the shape long in the shaft direction, as illustrated in FIG. 10C, a driven side spherical portion 92 cannot be sufficiently lightened and a thickness t2 of the driven side spherical portion 92 becomes thick, and the sink marks of the driven side spherical portion 92 cannot be sufficiently restrained. Therefore, in the structure illustrated in FIGS. 10A to 10C, the shaft direction length of the link device 90 needs to be reduced to 25 mm or less to reduce the thickness t2 of the driven side spherical portion 92.

FIGS. 11A, 11B, 11C, and 11D are diagrams illustrating a molding example of the link device 90 of the present embodiment.

Figure 11A:
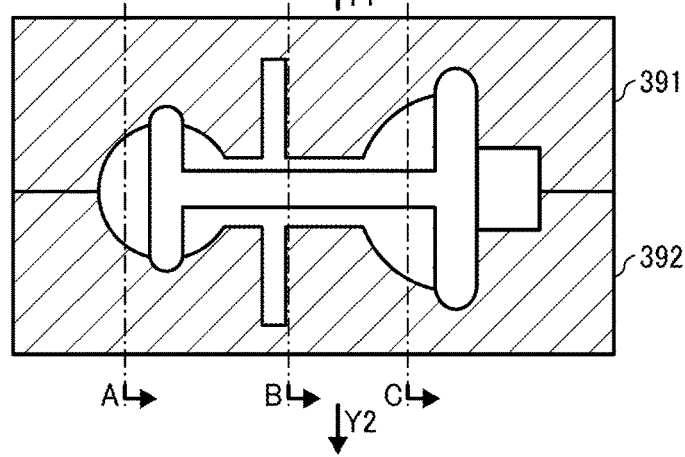
FIGS. 11A through 11D are diagrams illustrating a molding example of the link device of the present embodiment.
Figure 11B:
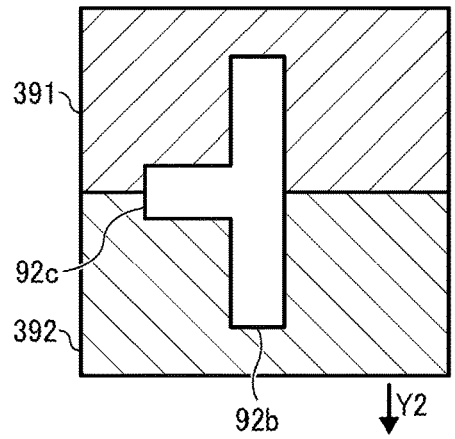
Figure 11C:
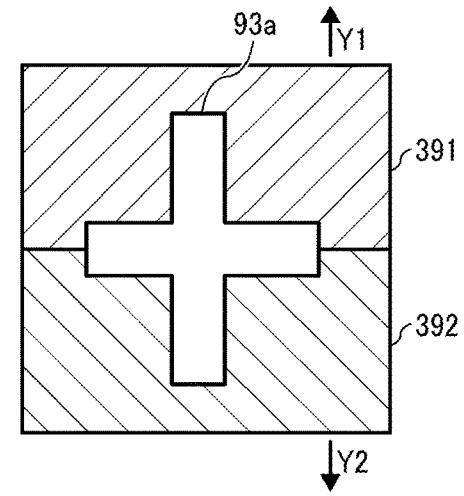
Figure 11D:
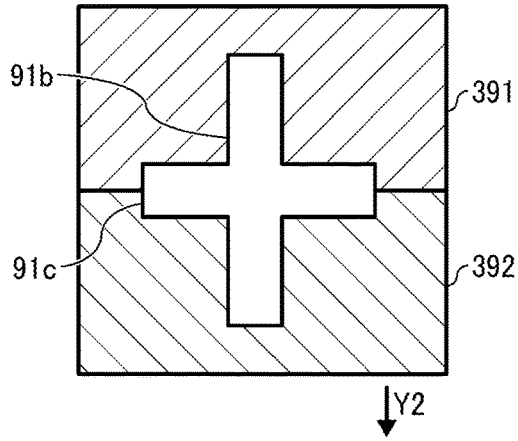

FIG. 11A is a cross-sectional view illustrating a molding example of the link device 90. FIG. 11B is an A-A vertical cross-sectional view of FIG. 11A. FIG. 11C is a B-B vertical cross-sectional view of FIG. 11A. Further, FIG. 11D is a C-C vertical cross-sectional view of FIG. 11A.

By forming the lightening portion 93a into the cross shape in cross section made of the linear portion extending in the Y direction and the linear portion extending in the Z direction, the lightening portion 93a can be formed by a first mold 391 and a second mold 392, as illustrated in FIG. 11C. Further, as illustrated in FIGS. 11B and 11D, the second large circles 91b and 92b and the third large circles 91c and 92c of the respective spherical portions 91 and 92 can be molded with the first mold 391 and the second mold 392, similarly to the lightening portion 93a of the linking member 93. Accordingly, as illustrated in FIG. 11A, the link device 90 can be molded with the first mold 391 that is moved in a $Y_1$ direction and the second mold 392 that is moved in a Y2 direction, and the link device 90 can be molded with a smaller number of molds than the comparative example illustrated in FIGS. 10A through 10C. Further, downsizing of the link device 90 is possible, compared with the configuration illustrated in FIGS. 10A through 10C. Further, even if the shaft direction length of the link device 90 becomes long, the thicknesses of the driven side spherical portion 92, the linking member 93, and the driving side spherical portion 91 can be made uniform. Accordingly, even if the link device 90 has a shape long in the shaft direction, a decrease in accuracy due to an influence of the sink marks can be restrained.

In the present embodiment, the thickness of the large circles 91a, 91b, and 91c, and 92a, 92b, and 92c of the respective spherical portions 91 and 92, and the thickness of the lightening portion 93a of the linking member 93, as illustrated in FIG. 8, and the thickness of the lightening portion 93a, as illustrated in FIG. 9, are equally TA [mm]. Further, the thickness of the disc shaped pressing target portion 97 provided to the linking member 93 is also TA [mm]. Accordingly, the influence due to the sink marks of the portions can be restrained, and the link device 90 can be accurately molded.

Figure 12:
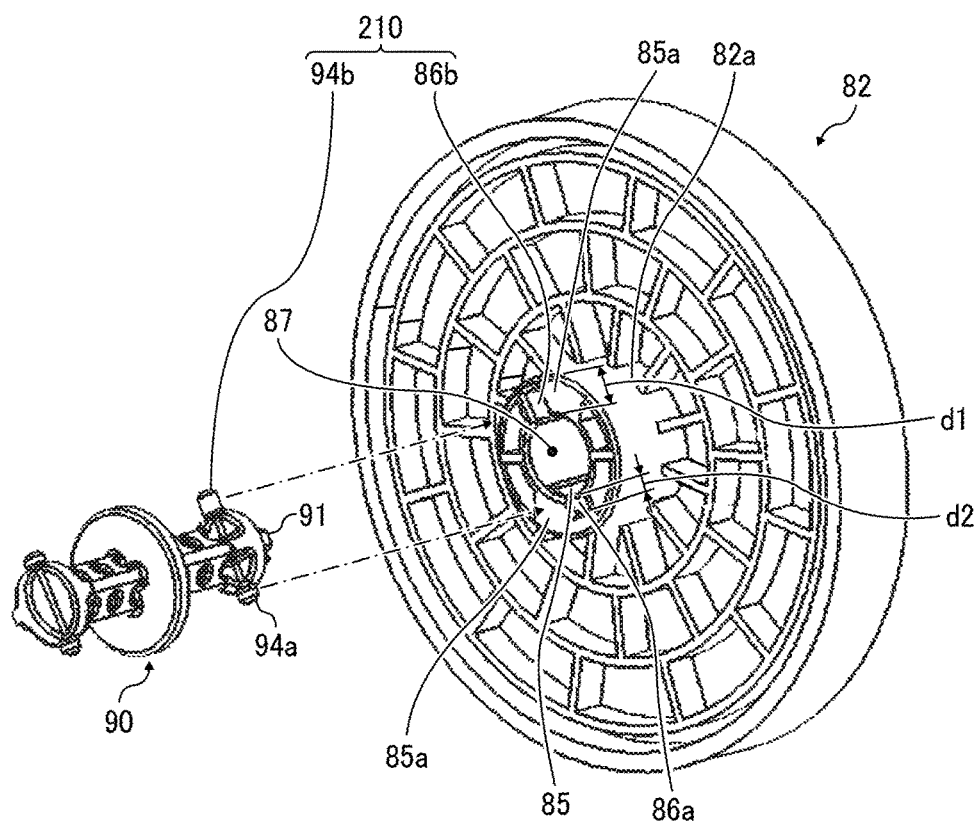
FIG. 12 is a perspective view illustrating a photoconductor gear and the link device according to an embodiment of this disclosure.
Figure 13:
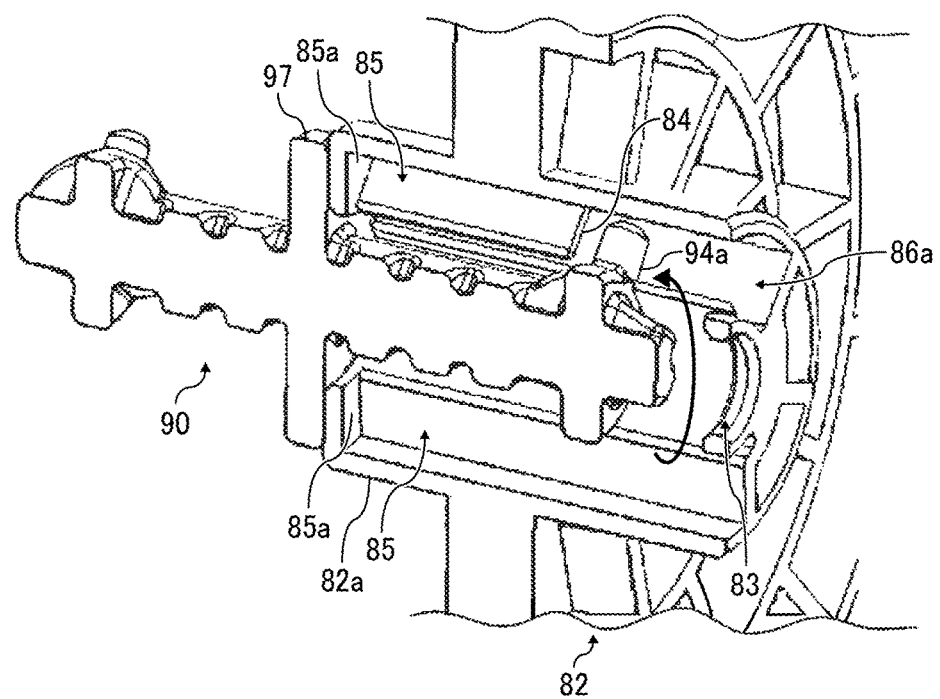
FIG. 13 is a cross section perspective view illustrating the photoconductor gear and the link device according to an embodiment of this disclosure.

FIG. 12 is a perspective view illustrating the photoconductor gear 82 and the link device 90, and FIG. 13 is a cross section perspective view illustrating the photoconductor gear 82 and the link device 90.

The photoconductor gear 82 is a resin molded item made of a polyacetal resin (POM), and includes the driving side cylindrical portion 82a in the rotation center. The driving side cylindrical portion 82a is provided with a drive side opening 87 into which the driving side spherical portion 91 of the link device 90 is inserted, two drive side grooves 85 into which the drive side projections 94a and 94b of the link device 90 are inserted are provided with an interval of 180 degrees in the rotating direction. Further, the driving side cylindrical portion 82a includes a first guide groove 86a that guides the first drive side projection 94a, adjacent to one drive side groove 85 in the rotating direction, and a second guide groove 86b as a phase matching groove that guides the second drive side projection 94b, adjacent to the other drive side groove 85 in the rotating direction. The one drive side groove 85 and the first guide groove 86a communicate into each other at a far side by a communicating portion 84, and the other drive side groove 85 and the second guide groove 86b similarly communicate into each other at a far side by the communicating portion 84.

As illustrated in FIG. 12, a groove depth d2 of the second guide groove 86b is slightly deeper than the height h2 of the second drive side projection 94b. Meanwhile, a groove depth d1 of the first guide groove 86a is deeper than the height h1 of the first drive side projection 94a, and shallower than the height h2 of the second drive side projection 94b (h1<d1<h2).

A stopper 85a is provided in a coupling member side end portion of the drive side groove 85, and when the link device 90 is about to be pulled out from the coupling side end portion of the drive side opening 87, the drive side projections 94a and 94b butt against the stoppers 85a. Accordingly, the link device 90 can be prevented from being pulled out from the coupling side end portion of the drive side opening 87.

Further, as illustrated in FIG. 13, an inserting opening portion 83, into which a regulating projection 112 (see FIG. 5) that regulates movement of the drive side projections 94a and 94b in the drive side groove 85 of the bearing 110 to the guide grooves 86a and 86b is inserted, is provided in a far side end portion of the driving side cylindrical portion 82a.

Next, a description is given of attachment of the link device 90 to the photoconductor gear 82.

First, the coil spring 73 is pushed into the drive side opening 87 of the driving side cylindrical portion 82a. Next, as illustrated in FIG. 12, a rotating direction position of the link device 90 is adjusted with respect to the photoconductor gear 82 such that the first drive side projection 94a is inserted into the first guide groove 86a, and the second drive side projection 94b is inserted into the second guide groove 86b.

In the present embodiment, the height h2 of the second drive side projection 94b as a phase matching projection is made higher than the height h1 of the first drive side projection 94a, and the groove depth d1 of the first guide groove 86a is made shallower than the groove depth d2 of the second guide groove 86b as a phase matching groove and is made shallower than the height h2 of the second drive side projection 94b. Accordingly, the second drive side projection 94b cannot be inserted into the first guide groove 86a, and only the first drive side projection 94a can be inserted into the first guide groove 86a. Accordingly, the link device 90 can be attached to the photoconductor gear 82 at a predetermined phase to the photoconductor gear 82. That is, in the present embodiment, the second drive side projection 94b and the second guide groove 86b configure a first phase matching device 210.

Further, the diameter of the second drive side projection 94b as a phase matching projection may be made larger than the diameter of the first drive side projection 94a, and the groove width of the first guide groove 86a may be made narrower than the diameter of the second drive side projection 94b. With the configuration, the second drive side projection 94b can be inserted into the second guide groove 86b only, and the link device 90 can be attached to the photoconductor gear 82 at a predetermined phase to the photoconductor gear 82.

Further, the diameter of the second drive side projection 94b as a phase matching projection may be made smaller than the diameter of the first drive side projection 94a, and the groove width of the second guide groove 86b may be made shorter than the diameter of the first drive side projection 94a. With the configuration, the second drive side projection 94b can be inserted into the second guide groove 86b only, and the link device 90 can be attached to the photoconductor gear 82 at a predetermined phase to the photoconductor gear 82.

Further, the first drive side projection 94a may be made uninsertable into the second guide groove 86b by a projection of the second guide groove 86b, by providing a recess in a position that does not affect drive transmission of the second drive side projection 94b, and providing a projection to the second guide groove 86b, the projection being fit to the recess. Accordingly, the second drive side projection 94b can be inserted into the second guide groove 86b, only, and the link device 90 can be attached to the photoconductor gear 82 at a predetermined phase to the photoconductor gear 82. Further, the projection may be provided in a position not affecting the drive transmission of the second drive side projection 94b, and the recess to which the projection is fit may be provided to the second guide groove 86b.

Next, the driving side spherical portion 91 of the link device 90 is inserted into the drive side opening 87, the first drive side projection 94a is inserted into the first guide groove 86a, and the second drive side projection 94b is inserted into the second guide groove 86b. Then, the spring 96 of the link device 90 is fit into the coil spring 73, and an end of the coil spring 73 is attached to the link device 90.

Figure 14:
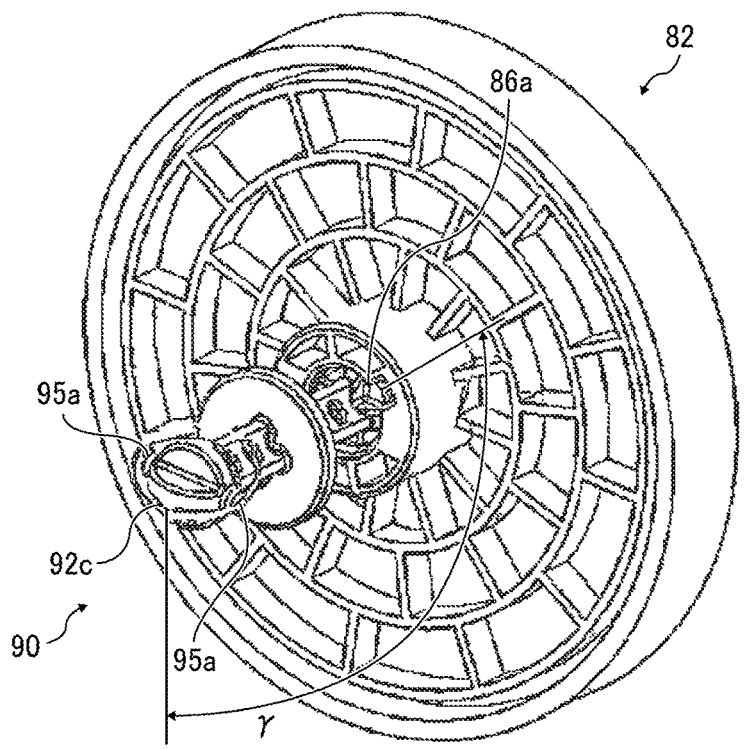
FIG. 14 is a perspective view illustrating a state in which the link device is attached to the photoconductor gear according to an embodiment of this disclosure.

Then, as illustrated in FIG. 13, the link device 90 is pushed into the driving side cylindrical portion 82a against the biasing force of the coil spring 73 until when the first and second drive side projections 94a and 94b are positioned to the communicating portion 84 that causes the guide grooves 86a and 86b and the drive side grooves 85 to communicate into each other. As illustrated in FIG. 13, when the link device 90 is pushed until when the first and second drive side projections 94a and 94b are positioned to the communicating portion 84 that causes the guide grooves 86a and 86b and the drive side grooves 85 to communicate into each other, the link device 90 is rotated, as illustrated by the arrow in FIG. 13. Then, the drive side projections 94a and 94b are moved to the drive side grooves 85 through the communicating portion 84. When the drive side projections 94a and 94b abut against side surfaces of the drive side grooves 85 and the rotation of the link device 90 is regulated, the link device 90 is released from the hand. Then, the link device 90 is moved toward the coupling member side by the biasing force of the coil spring 73, and the drive side projections 94a and 94b are inserted into the drive side grooves 85. Accordingly, as illustrated in FIG. 14, the link device 90 is attached to the photoconductor gear 82. Then, the photoconductor gear 82 to which the link device 90 is attached is attached to the far side plate 100b through the far side bearing 110 (see FIG. 3).

In the present embodiment, as described above, the height of the first drive side projection 94a and the height of the second drive side projection 94b are differentiated and the groove depth of the first guide groove 86a is made shallow, so that the second drive side projection 94b is made unable to be inserted into the first guide groove 86a. Accordingly, the link device 90 is attached to the photoconductor gear 82 at a predetermined phase to the photoconductor gear 82. As a result, as illustrated in FIG. 14, the link device 90 is attached to the photoconductor gear 82 such that the third driven side large circle 92c in the driven side spherical portion 92 is positioned to a position rotated in a clockwise direction with respect to the first guide groove 86a by an angle γ in FIG. 13 on a steady basis.

When the drive side projections 94a and 94b are inserted into the drive side grooves 85, the drive side projections 94 face the stoppers 85a, and the link device 90 can be prevented from being pulled out from the photoconductor gear 82, as described above.

In the present embodiment, the photoconductor gear 82 is provided with the stoppers 85a, and therefore, the number of components can be reduced and cost reduction of the device can be achieved, compared with a case where stopper members are provided separately from a photoconductor gear. Further, reduction of assembly man-hours can be achieved and manufacturing cost reduction can be achieved.

Figure 15:
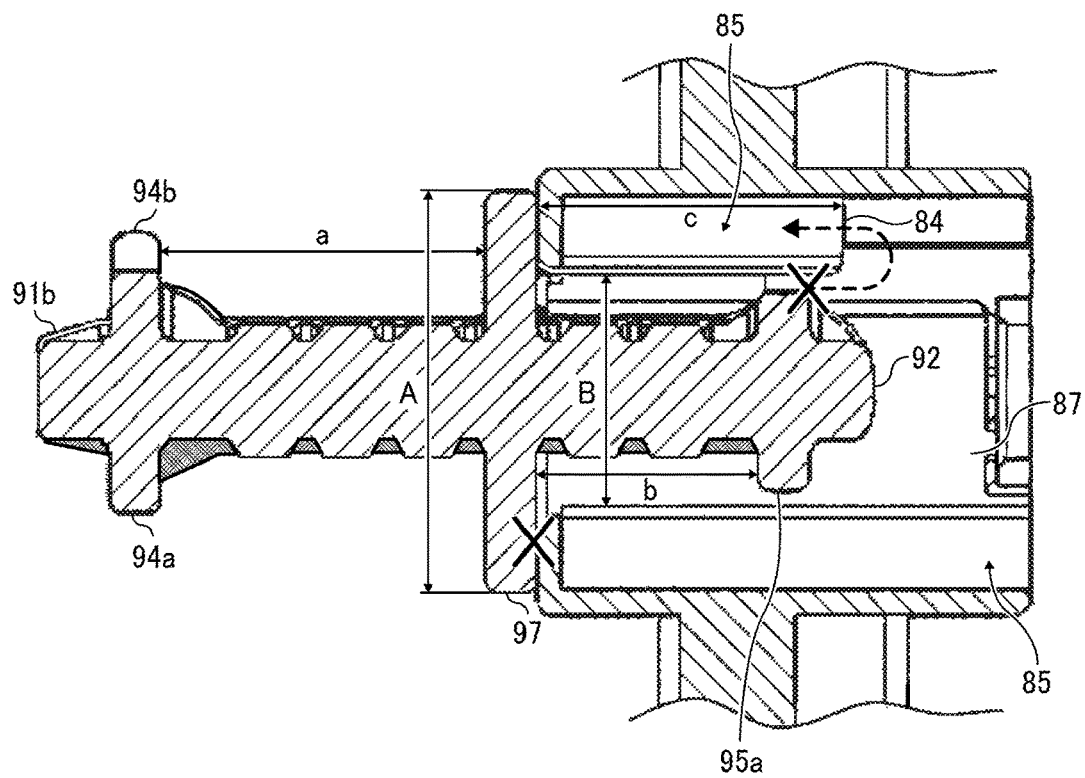
FIG. 15 is a diagram illustrating a state in which a driven side spherical portion is wrongly inserted into a drive side opening according to an embodiment of this disclosure.

FIG. 15 is a diagram illustrating a state in which the driven side spherical portion 92 is wrongly inserted into the drive side opening 87.

In the present embodiment, the pressing target portion 97 is provided on the driven side spherical portion side with respect to the shaft direction center of the linking member 93. To be specific, a relationship of b<c≤a is satisfied, where the distance from the drive side projections 94a and 94b to the pressing target portion 97 is a distance "a", the distance from the driven side projection 95a to the pressing target portion 97 is a distance "b", and the distance from the communicating portion 84 to the coupling member side end portion of the driving side cylindrical portion 82a is a distance "c". Further, A>B is satisfied, where the diameter of the pressing target portion 97 is a diameter "A", and the inner diameter of the drive side opening 87 is an inner diameter "B".

Since such dimensional relationships are satisfied, when the driven side spherical portion 92 is wrongly inserted into the drive side opening 87, as illustrated in FIG. 15, the pressing target portion 97 butts against the coupling member side end portion of the driving side cylindrical portion 82a before the driven side projection 95a reaches the communicating portion 84. Accordingly, the driven side projection 95a cannot be inserted into the drive side groove 85, and the link device 90 cannot be assembled to the photoconductor gear 82.

Meanwhile, the distance from the drive side projections 94a and 94b to the pressing target portion 97 is equal to or more than the distance from the communicating portion 84 to the coupling member side end portion of the driving side cylindrical portion 82a. Therefore, if the driven side spherical portion 92 is correctly inserted, the drive side projections 94a and 94b can be inserted up to the communicating portion 84. Accordingly, the driven side projections 95a can be inserted into the drive side grooves 85, and the link device 90 can be assembled to the photoconductor gear 82.

Figure 16:
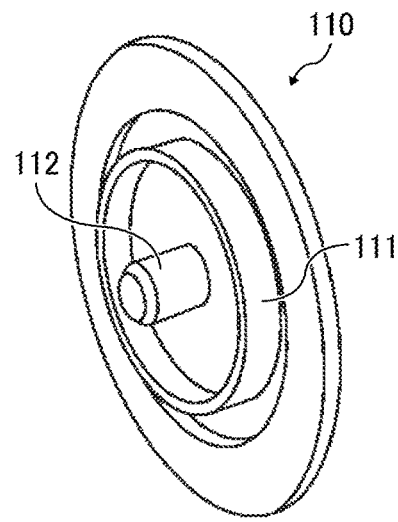
FIG. 16 is a perspective view of a far side bearing according to an embodiment of this disclosure.

FIG. 16 is a perspective view of the far side bearing 110.

As illustrated in FIG. 16, the far side bearing 110 includes a cylindrical receiver 111 having an outer peripheral surface that is fitted into the hole opening of the far side plate 100b, and an inner peripheral surface rotatably receives the driving side cylindrical portion 82a of the photoconductor gear 82. Further, the regulating projection 112 that regulates the movement of the link device 90 to the far side is included in a central portion of the far side bearing 110.

As illustrated in FIG. 5, the driving side cylindrical portion 82a of the photoconductor gear 82 is inserted into the receiver 111 of the bearing 110 such that the regulating projection 112 of the far side bearing 110 fit and secured to the opening portion of the far side plate 100b is inserted into the inserting opening portion 83.

Figure 17:
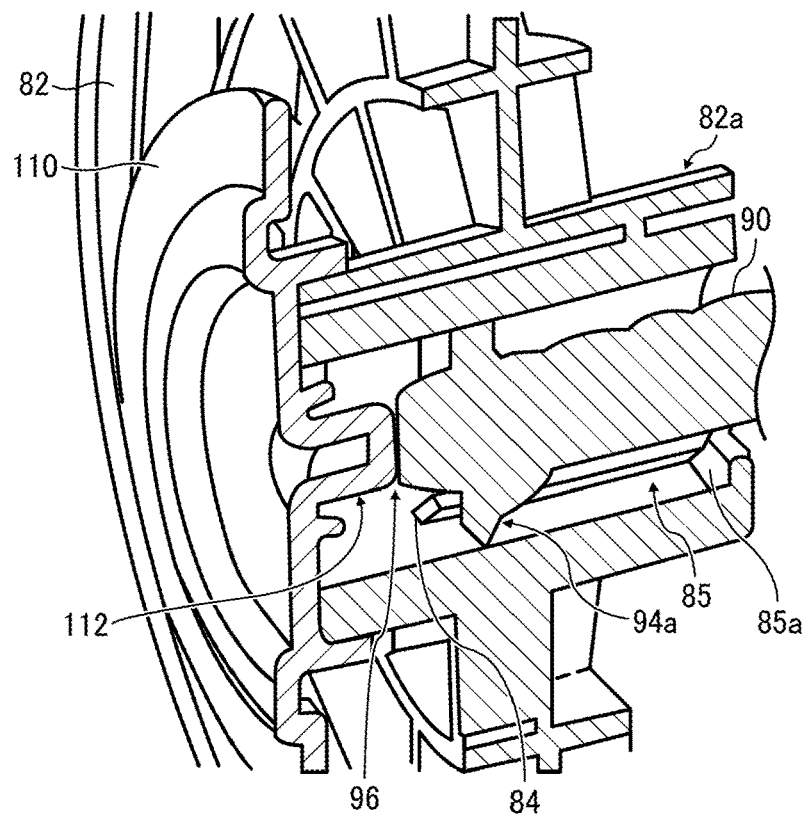
FIG. 17 is a diagram for describing regulation by a regulating projection of the far side bearing according to an embodiment of this disclosure.

FIG. 17 is a diagram for describing regulation by the regulating projection 112 of the far side bearing 110.

As illustrated in FIG. 17, when the link device 90 is pushed into the driving side cylindrical portion 82a of the photoconductor gear 82, the spring 96 of the link device 90 butts against the regulating projection 112 before the drive side projections 94a and 94b reach the communicating portion 84. Accordingly, the movement of the link device 90 in the shaft direction is regulated before the drive side projections 94a and 94b in the drive side groove 85 are moved to the communicating portion 84. As a result, even if the link device 90 is relatively rotated with respect to the photoconductor gear 82, the drive side projections 94a and 94b in the drive side groove 85 cannot be moved to the guide grooves 86a and 86b through the communicating portion 84. Accordingly, after the photoconductor gear 82 is supported by the far side plate 100b through the bearing 110, the link device 90 cannot be pulled out from the photoconductor gear 82.

Figure 18:
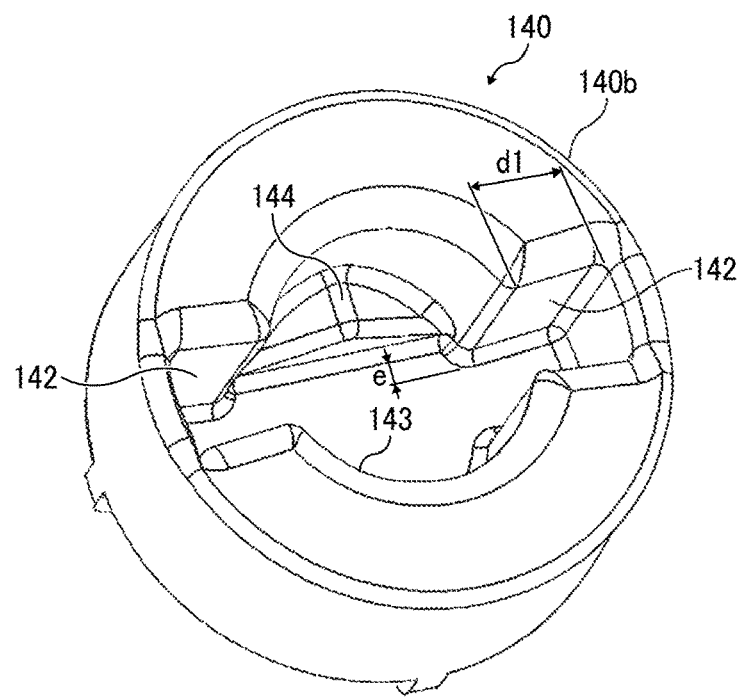
FIG. 18 is a perspective view of a coupling member according to an embodiment of this disclosure.
Figure 19:
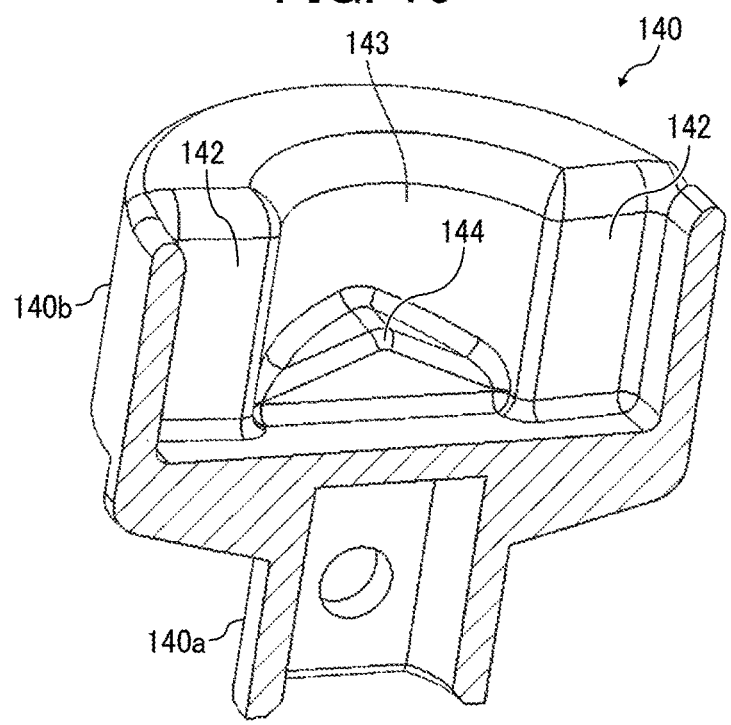
FIG. 19 is a cross section perspective view of the coupling member according to an embodiment of this disclosure.

FIG. 18 is a perspective view of the coupling member 140, and FIG. 19 is a cross section perspective view of the coupling member 140.

The coupling member 140 as a second drive transmitter includes the shaft inserting portion 140a and the driven side cylindrical portion 140b. The coupling member 140 is favorably formed of a polyacetal resin (POM) having excellent mechanical strength, and favorable wear resistance and slidability.

The driven side cylindrical portion 140b of the coupling member 140 has a shape with only a drive side open, and has a driven side opening 143 into which the driven side spherical portion 92 of the link device 90 is inserted. Further, two driven side grooves 142, into which the driven side projections 95a of the link device 90 are inserted, are provided in the driven side cylindrical portion 140b at an interval of 180 degrees in the rotating direction. A groove depth d1 of the driven side groove 142 is slightly deeper than the height $h_1$ of the driven side projection 95a. Further, a phase matching projection 144 is formed in a position shifted from the rotation center on a bottom surface of the driven side spherical portion 92.

As illustrated in FIG. 19, the phase matching projection 144 has a mountain shape in which the height becomes gradually lower from a central portion toward an outside. Further, as illustrated in FIG. 18, the phase matching projection 144 is formed up to a position retracted by a length e mm from the position of the driven side grooves 142.

Figure 20:
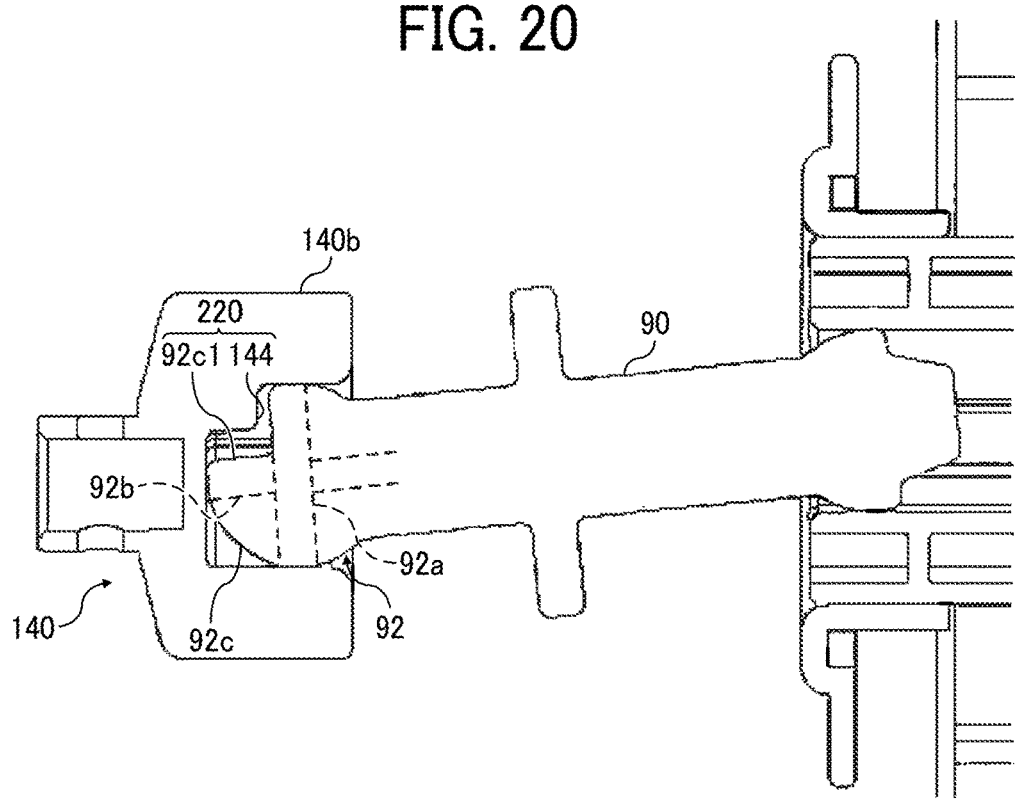
FIG. 20 is a cross-sectional view illustrating a state in which a driven side spherical portion of the link device is inserted in a driven side cylindrical portion of the coupling member according to an embodiment of this disclosure.

FIG. 20 is a cross-sectional view illustrating a state in which the driven side spherical portion 92 of the link device 90 is inserted into the driven side cylindrical portion 140b of the coupling member 140.

When the coupling member 140 and the link device 90 are tried to be linked in a state where the phase matching projection 144 is positioned downward in FIG. 20, the third driven side large circle 92c of the driven side spherical portion 92 butts against the phase matching projection 144. As a result, the driven side spherical portion 92 cannot be inserted into the driven side cylindrical portion 140b of the coupling member 140 and the driven side projections 95a cannot be inserted into the driven side grooves 142 and drive link cannot be performed. That is, when the phase in the rotating direction of the phase matching projection 144 is matched with the cut portion of the third driven side large circle 92c of the driven side spherical portion 92, the driven side spherical portion 92 is inserted into the driven side cylindrical portion 140b, the driven side projections 95a are inserted into the driven side grooves 142, and the drive link is performed. That is, in the present embodiment, the phase matching projection 144 and the cut portion of the third driven side large circle 92c of the driven side spherical portion 92 configure a second phase matching device 220.

As described above, in the present embodiment, the photoconductor gear 82 and the link device 90 are attached at a predetermined phase, and the drive link between the link device 90 and the coupling member 140 is performed at a predetermined phase. As a result, drive link between the photoconductor gear 82 and the coupling member 140 can be performed at a predetermined phase.

As described above, the photoconductor gear 82 is a resin molded item, and the shape cannot become a perfect circle and slightly becomes an elliptical shape because of sink marks or the like. As a result, the photoconductor gear 82 has speed variation of one rotation period. If phases of the speed variation of the photoconductor gears are different among the colors, out of color registration according to the phases is caused, and the color image is affected. To be specific, if the photoconductor gear 82 has the speed variation, the photoconductor 2 also has speed variation according to the speed variation of the photoconductor gear 82, and the image are expanded/contracted according to the speed variation of the photoconductor 2. That is, when the speed of the photoconductor 2 is fast, the image to which write or transfer has been performed is expanded. When the speed of the photoconductor 2 is slow, the image to which write or transfer has been performed is contracted. By adjusting the phases of the speed variation of the photoconductor gears 82 of the respective colors such that expanded portions or contracted portions of the images of the colors are superimposed, the out of color registration can be restrained. Phase matching of the photoconductor gears 82 of the colors is performed by marking a position of a maximum diameter of the photoconductor gear 82, and attaching the photoconductor gears 82 of the colors to the far side plate 100*b*, using the mark as a landmark.

Further, in the photoconductor 2 as a rotary body to which the coupling member 140 is attached, speed variation of one rotation period is caused due to eccentricity of the photoconductor 2 or the like. Therefore, the photoconductors 2 need to be assembled to the housing 100, by adjusting the phases of the speed variation of the photoconductors 2 of the colors.

In the present embodiment, the driven side projections 95*a* are provided at an interval of 180 degrees in the rotating direction. Therefore, even if the coupling member 140 is rotated by 180 degrees from a state where the phases of the driven side projections 95*a* and the driven side grooves 142 in the rotating direction are matched, the phases of the driven side projections 95*a* and the driven side grooves 142 in the rotating direction become matched. As a result, the photoconductor 2 may be assembled to the housing 100 in a state where the phase is shifted with respect to a predetermined phase by an angle of 180 degrees, and out of color registration may be caused.

In response to that, in the present embodiment, the phase matching projection 144 is included. Therefore, even if the phases of the driven side projections 95*a* and the driven side grooves 142 in the rotating direction are matched, the drive link cannot be performed when the third driven side large circle 92*c* faces the phase matching projection 144. From the state, the coupling member 140 is relatively rotated with respect to the link device 90 by an angle of 180 degrees, the driven side spherical portion 92 is inserted into the driven side cylindrical portion 140*b*, and the drive link is performed. Accordingly, the photoconductors 2 can be assembled to the housing 100 at a predetermined phase, and the out of color registration can be restrained.

Further, the drive side projections 94*a* and 94*b* provided at an interval of 180 degrees in the rotating direction. Therefore, in a case where the heights of the drive side projections 94*a* and 94*b* and the groove depths of the guide grooves 86*a* and 86*b* are equal, even if the link device 90 is rotated with respect to the photoconductor gear 82 by an angle of 180 degrees from a state where the phases of the drive side projections 94*a* and 94*b* and the guide grooves 86*a* and 86*b* in the rotating direction are matched, the phases of the driven side projections 95*a* and the driven side grooves 142 in the rotating direction are matched. Therefore, even if the coupling member 140 is linked with the link device 90 at a predetermined phase, and the speed variation phases of the photoconductors 2 are matched, the phase of the speed variation of the photoconductor gear 82 may be shifted from the predetermined phase by an angle of 180 degrees. However, in the present embodiment, the heights of the drive side projections 94*a* and 94*b* are differentiated, and the second drive side projection 94*b* cannot be inserted into the first guide groove 86*a*. Accordingly, the rotation speed phase of the photoconductor gear 82 can be prevented from being shifted from the speed variation of another photoconductor gear 82 by and angle of 180 degrees, and the out of color registration can be restrained.

In the present embodiment, as illustrated in FIG. 3, the process unit 1 including the photoconductor 2 is moved in the direction perpendicular to the shaft direction of the photoconductor 2 and is attached to and detached from the housing 100. Therefore, when the process unit 1 is taken out from the housing 100, the driven side spherical portion 92 of the link device 90 needs to be pulled out from the driven side cylindrical portion 140*b* of the coupling member 140 to release the drive link between the drive side and the rotary body side. Further, when the process unit 1 is inserted into the housing 100, the driven side spherical portion 92 of the link device 90 needs to be retracted not to collide with the coupling member 140.

Therefore, in the present embodiment, the releasing member 60 is provided, and when the process unit 1 is attached to and detached from the housing 100, the link device 90 is moved toward the photoconductor gear 82 side by the releasing member 60, and is retracted to a release position where the drive link between the link device 90 and the coupling member 140 is released.

Figure 21:
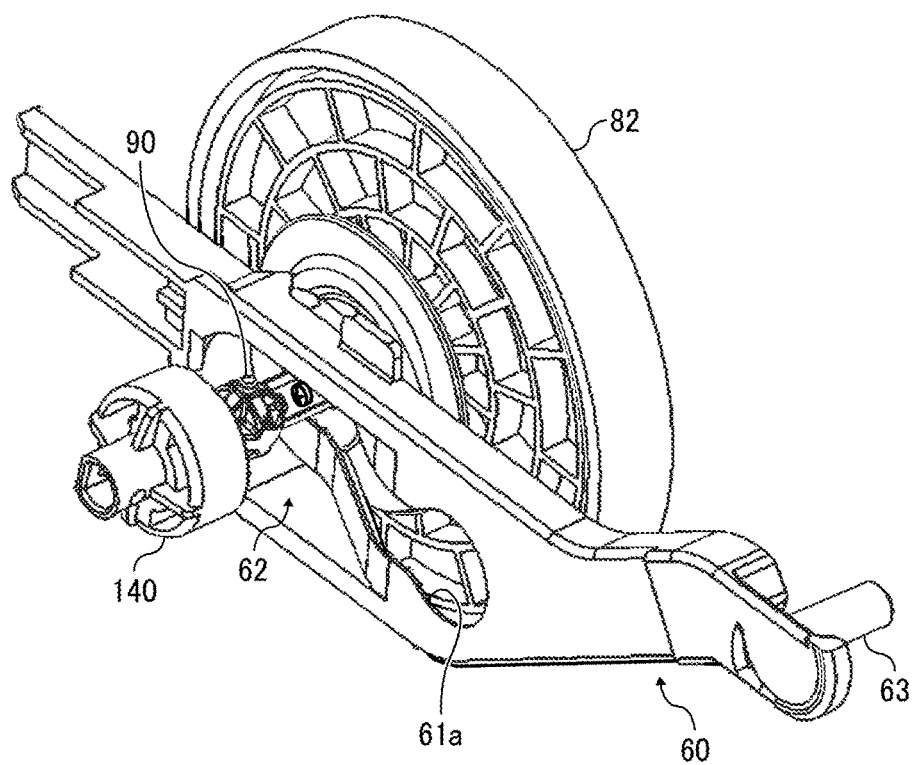
FIG. 21 is a perspective view of the drive transmission device, illustrating a state in which the link device is retracted to a release position according to an embodiment of this disclosure.
Figure 22:
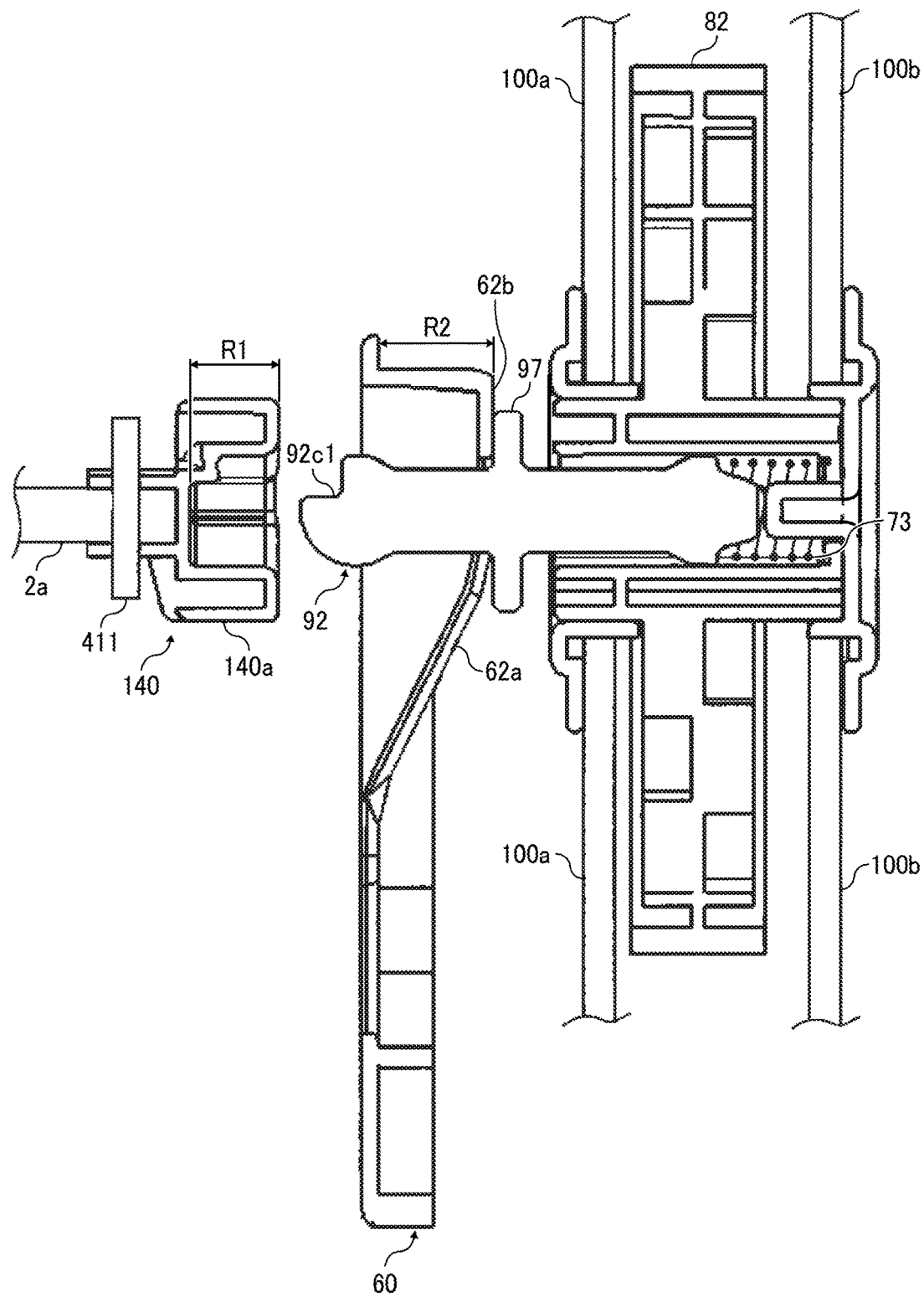
FIG. 22 is a cross-sectional view of the drive transmission device, illustrating a state in which the link device is retracted to a release position according to an embodiment of this disclosure.

FIG. 21 is a perspective view of the drive transmission device 70, illustrating a state in which the link device 90 is retracted to the release position, and FIG. 22 is a cross-sectional view of the drive transmission device 70, illustrating the state in which the link device 90 is retracted to the release position.

The releasing lever attached to the lever attaching portion 63 of the releasing member 60 moves the releasing member 60 in conjunction with opening and closing of the intermediate cover 102 (see FIG. 3) by a link mechanism, or the like. When the intermediate cover 102 is being opened, the releasing lever moves the releasing member 60 in the arrow DA direction illustrated in FIG. 4. Then, the pressing target portion 97 of the link device 90 abuts against the inclined face portion 62*a* of the pressing portion 62 inclined to be positioned toward the photoconductor gear 82 side as away from the attaching opening portion 61*a* of the releasing member 60. From this state, the intermediate cover 102 is further opened and the releasing member 60 is moved in the arrow DA direction illustrated in FIG. 4, the pressing target portion 97 is pushed into the photoconductor gear 82 side by the inclined face portion 62*a* of the pressing portion 62. Accordingly, the link device 90 is moved toward the photoconductor gear 82 (the arrow DB direction in FIG. 5), against the biasing force of the coil spring 73, and the driven side spherical portion 92 is pulled out from the driven side cylindrical portion 140*b* of the coupling member 140.

When the intermediate cover 102 is moved to an open position illustrated in FIG. 3, the pressing target portion 97 reaches the flat face portion 62*b* of the pressing portion 62, as illustrated in FIGS. 21 and 22. The link device 90 is moved toward the photoconductor gear 82 by the pressing portion 62 by the depth R2 of the recess of the flat face portion 62*b* toward the photoconductor gear 82 side. As described above, the depth $R_2$ of the recess of the flat face portion 62*b* toward photoconductor gear 82 side is deeper than the length R1 of the driven side cylindrical portion 140*b* of the coupling member 140. Therefore, when the pressing target portion 97 reaches the flat face portion 62*b* of the pressing portion 62, and the link device 90 is positioned to the release position, the driven side spherical portion 92 is pulled out from the driven side cylindrical portion 140*b* of the coupling member 140, and the drive link between the coupling member 140 and the link device 90 is released. Accordingly, the drive link between the drive side and the rotary body side is released, and the process unit 1 can be moved in the direction perpendicular to the shaft direction and pulled out from the housing 100.

Further, when the process unit 1 is attached to the housing 100, the intermediate cover 102 is positioned in the open position, and the link device 90 is positioned in the release position and retracted by the releasing member 60. Therefore, when the process unit 1 is attached to the housing 100, the process unit 1 can be attached without causing a collision of the coupling member 140 with the driven side spherical portion 92 of the link device 90.

When the process unit 1 is attached, and the intermediate cover 102 is being closed, the releasing member 60 is moved upward in FIG. 22 by the releasing lever. Accordingly, the pressing target portion 97 is moved to the inclined face portion 62*a* of the pressing portion 62. When the pressing target portion 97 is moved to the inclined face portion 62*a* of the pressing portion 62, the link device 90 is moved toward the coupling member 140 side by the biasing force of the coil spring 73, and the driven side spherical portion 92 is being inserted into the driven side cylindrical portion 140*b* of the coupling member 140. Then, when the intermediate cover 102 is positioned to a close position, the linking member 93 of the link device 90 is positioned to the attaching opening portion 61*a* of the releasing member 60, as illustrated in FIGS. 4 and 5.

When the driven side spherical portion 92 of the link device 90 is inserted into the driven side cylindrical portion 140*b* of the coupling member 140, if the phases of the coupling member 140 and the link device 90 are not matched, the driven side projection 95*a* butts against an edge portion of the driven side cylindrical portion 140*b* of the coupling member 140, or the third driven side large circle 92*c* butts against the phase matching projection 144, and the drive link between the coupling member 140 and the link device 90 is not performed. However, if the link device 90 is driven and rotated together with the photoconductor gear 82, the phases of the driven side projection 95*a* and the driven side groove 142 are matched, and the abutting between the third driven side large circle 92*c* and the phase matching projection 144 is released, and the phases of the link device 90 and the coupling member 140 are matched. Then, the link device 90 is moved toward the coupling member side by the biasing force of the coil spring 73, the driven side spherical portion 92 is inserted into the driven side opening 143, and the driven side projections 95*a* are inserted into the driven side grooves 142. Accordingly, drive link between the link device 90 and the coupling member 140 is performed at a predetermined phase, and the driving force is transmitted from the link device 90 to the coupling member 140.

Further, in the present embodiment, the pressing target portion 97 pressed by the pressing portion 62 of the releasing member 60 toward the photoconductor gear 82 side has a disc shape. For example, in a case where the pressing target portions 97 are protrusions protruding in the radial direction and provided at an interval of 180° in the rotating direction, similarly to the drive side projections 94*a* and 94*b*, the protruding direction of the pressing target portions 97 becomes the same as the moving direction of the releasing member 60 depending on a rotation position of the link device 90 when drive is stopped. If the protruding direction of the pressing target portions 97 becomes the same as the moving direction of the releasing member 60, the pressing target portions 97 do not abut against the pressing portions 62 provided in both sides of the moving opening portion 61*b*. As a result, even if the releasing member 60 is moved, the link device 90 cannot be retracted toward the photoconductor gear 82 side. In contrast, by forming the pressing target portion 97 into the disc shape, the pressing target portion 97 can abut against the pressing portion 62 regardless of the rotation position of the link device 90 when the drive is stopped. Accordingly, the link device 90 can be reliably retracted toward the photoconductor gear 82 side by the releasing member 60.

When there is a gap between the rotation center of the photoconductor gear 82 and the rotation center of the photoconductor shaft 2*a* (hereinafter, the gap is referred to as shaft center gap), the link device 90 is inclined, so that the drive link can be performed. In the present embodiment, the first inserting body inserted into the driving side cylindrical portion 82*a* of the photoconductor gear 82 of the link device 90 and the second inserting body inserted into the driven side cylindrical portion 140*b* of the coupling member 140 have spherical shapes. Accordingly, in a case where there is the shaft center gap, the link device 90 can be smoothly inclined, and the shaft center gap can be favorably absorbed. To be specific, the arc-shaped surfaces of the first, second, and third drive side large circles 91*a*, 91*b*, and 91*c* of the driving side spherical portion 91 inserted into the driving side cylindrical portion 82*a* of the photoconductor gear 82 smoothly slide on the inner peripheral surface of the drive side opening 87, and the link device 90 is smoothly inclined with respect to the photoconductor gear 82. Further, the arc-shaped surfaces of the first, second, and third driven side large circles 92*a*, 92*b*, and 92*c* of the driven side spherical portion 92 inserted into the driven side cylindrical portion 140*b* of the coupling member 140 smoothly slide on the inner peripheral surface of the driven side opening 143 and the bottom surface of the driven side cylindrical portion 140*b*, and the link device 90 is smoothly inclined with respect to the coupling member 140. Accordingly, the link device 90 is smoothly inclined and can absorb the shaft center gap. Further, the first inserting body and the second inserting body have the spherical shapes, so that rotation speed unevenness of the photoconductor 2 can be restrained.

Figure 23A:
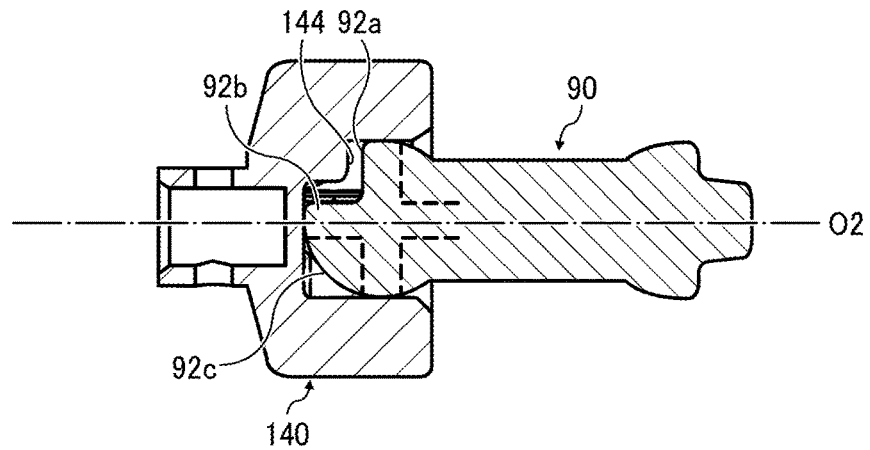
FIGS. 23A through 23C are cross-sectional views of the coupling member and the link device cut in a direction perpendicular to a protruding direction of a driven side projection according to an embodiment of this disclosure.
Figure 23B:
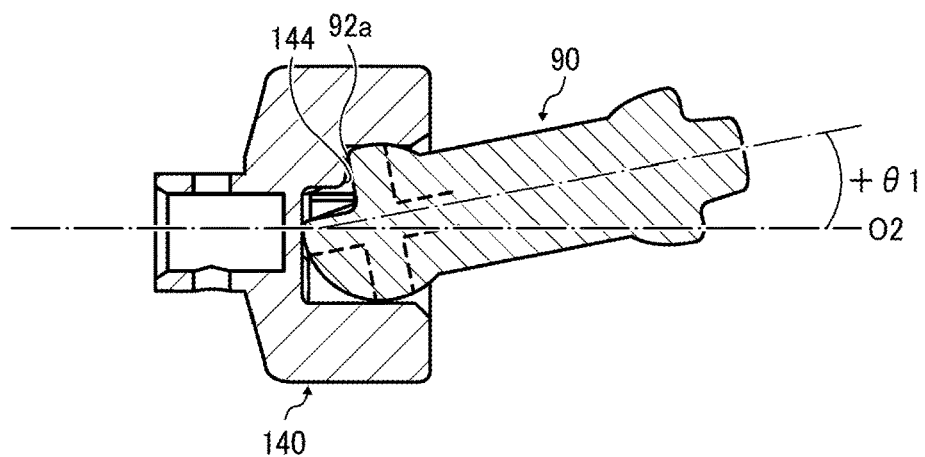
Figure 23C:
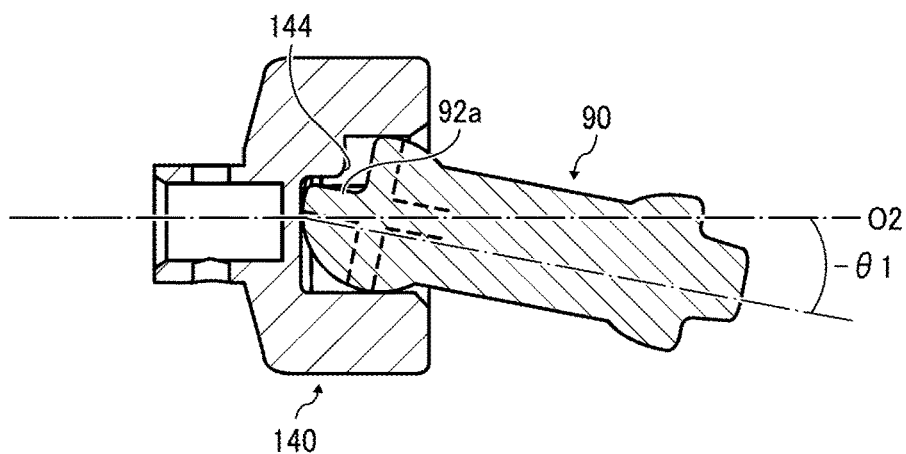

FIGS. 23A through 23C are cross-sectional views of the coupling member 140 and the link device 90 cut in the direction perpendicular to the protruding direction of the driven side projection 95*a*.

As illustrated in FIG. 23A, when the link device 90 is not inclined, the phase matching projection 144 has a height having a predetermined gap with respect to a side surface of the first driven side large circle 92*a*. This gap allows the first driven side large circle 92*a* not to come in contact with the phase matching projection 144 even if the link device 90 is inclined by a maximum inclination angle +θ1, the maximum inclination angle being in the direction perpendicular to the protruding direction of the driven side projection 95*a* of the link device 90, as illustrated in FIG. 23B.

Further, as illustrated in FIG. 18, the phase matching projection 144 is not formed up to the position flush with the side surface of the driven side groove 142, and is retracted by e mm from the side surface of the driven side groove 142. Therefore, when the link device 90 is not inclined, as illustrated in FIG. 23A, the predetermined gap is formed between the side surface of the phase matching projection 144 and the side surface of the second driven side large circle 92*b*. This gap allows the second driven side large circle 92*b* not to come in contact with the phase matching projection 144, even if the link device 90 is inclined by the maximum inclination angle −θ1, the maximum inclination angle being in the direction perpendicular to the protruding direction of the driven side projection 95*a* of the link device 90, as illustrated in FIG. 23C.

Figure 24A:
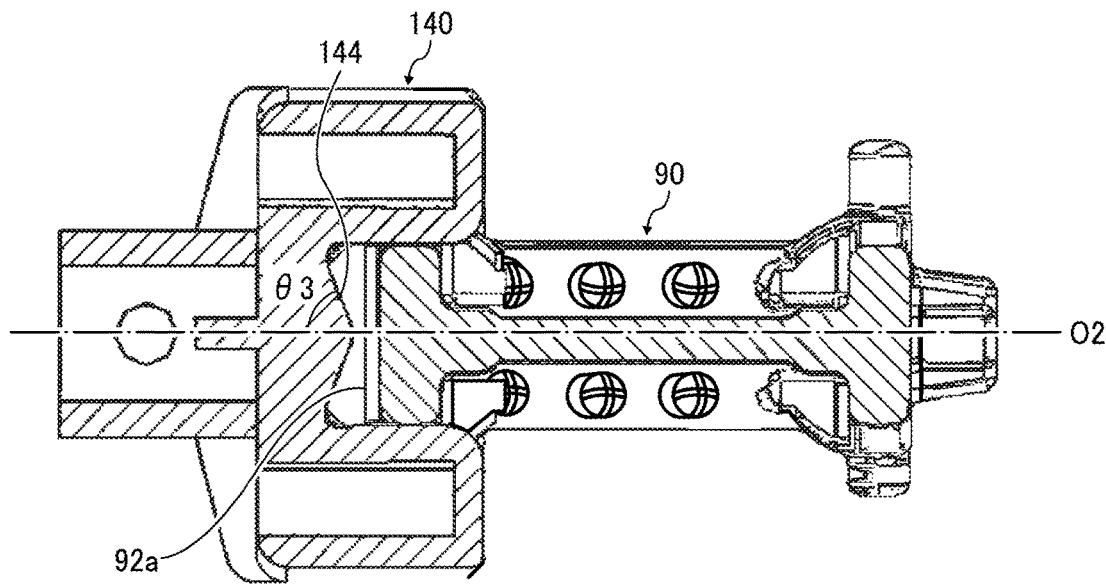
FIGS. 24A through 24C are cross-sectional views of the coupling member and the link device cut in a direction parallel to the protruding direction of the driven side projection according to an embodiment of this disclosure.
Figure 24B:
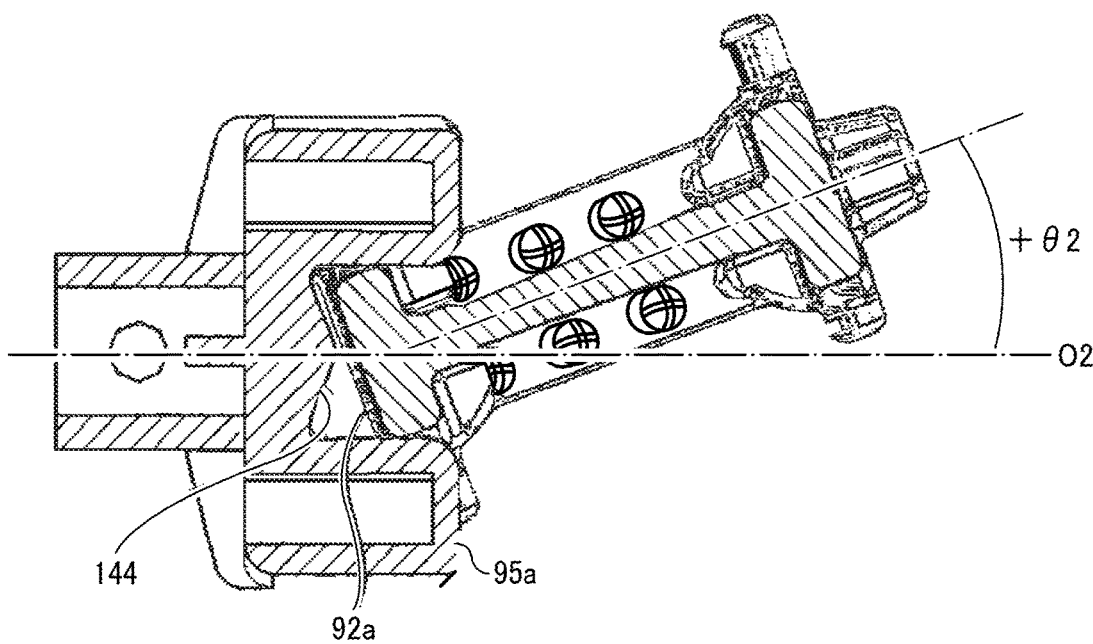
Figure 24C:
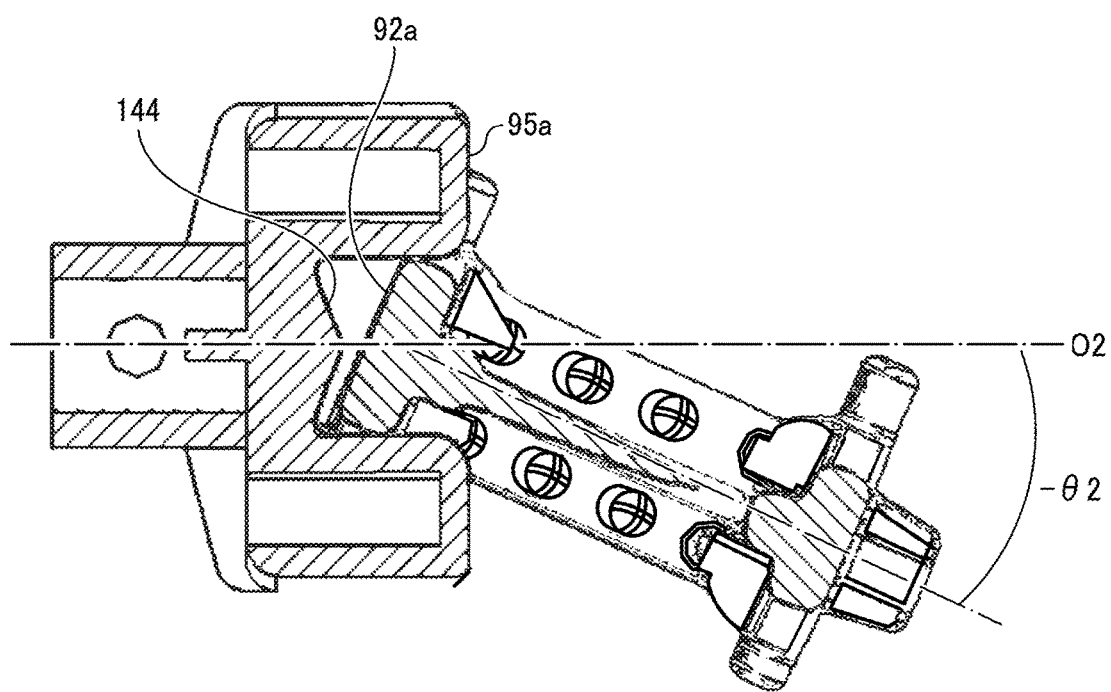

FIGS. 24A through 24C are cross-sectional views of the coupling member 140 and the link device 90 cut in parallel to the protruding direction of the driven side projection 95a.

The phase matching projection 144 has a mountain shape where the height of the cross section becomes lower from the center toward an end portion, as illustrated in FIG. 24A. Then, an inclination angle θ3 of an inclined surface of the phase matching projection 144 is set to an angle that allows the side surface of the first driven side large circle 92a not to abut against the phase matching projection 144, when the link device 90 is inclined by a maximum inclination angle θ2 in a direction parallel to the protruding direction of the driven side projection 95a, as illustrated in FIGS. 24B and 24C.

As described above, in the present embodiment, the phase matching projection 144 does not impede the inclination of the link device 90, and thus the shaft center gap can be favorably absorbed by the link device 90. It is to be noted that the maximum inclination angle of the link device 90 is an angle of when the inclination is regulated when the linking member 93 of the link device 90 butts against the edge portion of the driven side cylindrical portion 140b of the coupling member 140, or butts against the edge portion of the driving side cylindrical portion 82a of the photoconductor gear 82.

It is to be noted that a reference letter "O2" indicates a shaft core of the coupling member 140 in FIGS. 23A, 23B, 23C, 24A, 24B, and 24C. Specifically, FIGS. 23A through 23C indicate that, even when the link device 90 is inclined by an angle of +θ1 or −θ1, the second driven side large circle 92b does not contact with the phase matching projection 144. Further, FIGS. 24A through 24C indicated that, even when the link device 90 is inclined by an angle of +θ2 or −θ2, the side surface of the first driven side large circle 92a does not abut against the phase matching projection 144.

Further, the configuration to match the phase of the driven side (the phases between the coupling member 140 and the link device 90) may be caused to be the same configuration as the configuration to match the phase of the drive side (the phases between the photoconductor gear 82 and the link device 90). That is, the lengths of the driven side projections 95a are differentiated from each other and the groove depths of the driven side grooves 142 are differentiated from each other, and the driven side projections 95a can be inserted into the predetermined driven side grooves 142.

Further, in the present embodiment, the drive side projections 94a and 94b to which the driving force is transmitted from the photoconductor gear 82 of the link device 90, and the driven side projections 95a that transmit the driving force to the coupling member 140 have columnar shapes. Accordingly, the projections of the present embodiment have an advantage of restraining the angular speed variation, compared with a comparative configuration in which the drive side projections and the driven side projections have hemisphere shapes. Hereinafter, a specific description will be given using the drawings.

Figure 25A:
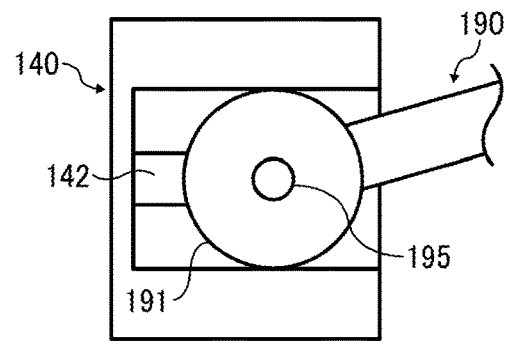
FIGS. 25A through 25C are diagrams for describing drive transmission of a known link and coupling member.
Figure 25B:
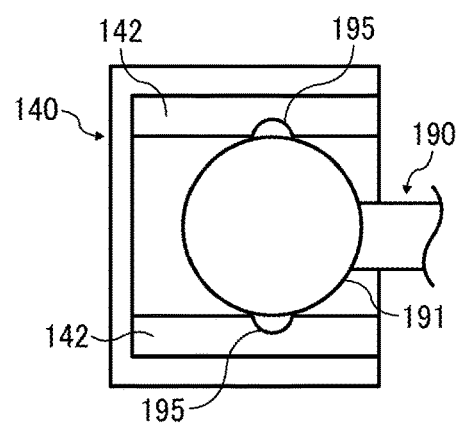
Figure 25C:
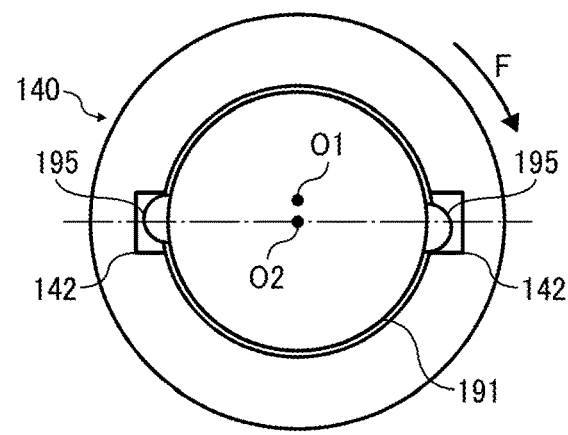
Figure 26A:
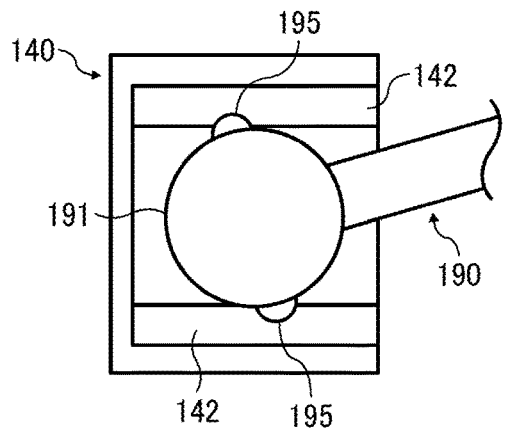
FIGS. 26A through 26C are diagrams illustrating a state rotated by an angle of 90 degrees from the state of FIGS. 25A through 25C.
Figure 26B:
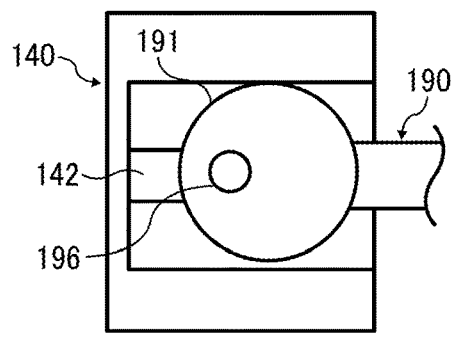
Figure 26C:
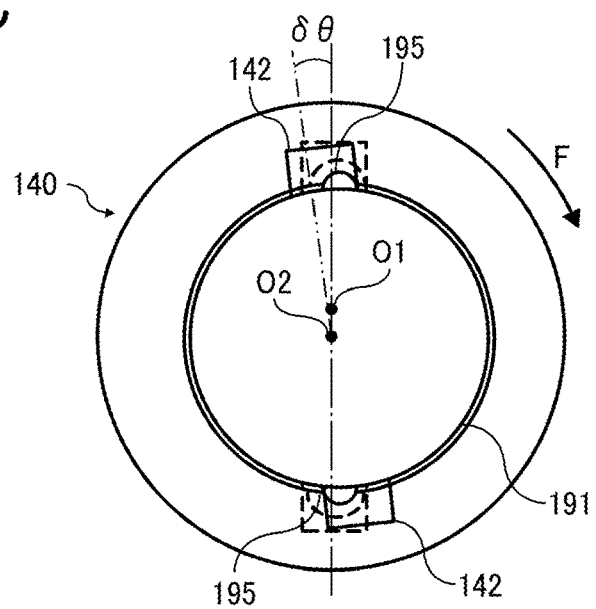

FIGS. 25A through 25C are diagrams for describing drive transmission between a comparative link and a coupling member. FIG. 25A is a schematic view as viewed from a direction perpendicular to an inclination direction of the link. FIG. 25B is a schematic view as viewed from above FIG. 25A. FIG. 25C is a schematic view as viewed from a shaft direction. Further, FIGS. 26A through 26C are diagrams illustrating a state rotated by an angle of 90 degrees from the state of FIGS. 25A through 25C. FIG. 26A is a schematic view as viewed from the direction perpendicular to the inclined direction of the link, FIG. 26B is a schematic view as viewed from above FIG. 26A, and FIG. 26C is a schematic view as viewed from the shaft direction.

It is to be noted that, in FIGS. 25A, 25B, 25C, 26A, 26B, and 26C, a reference letter "O2" indicates the shaft core of the coupling member 140, a reference letter "O1" indicates a shifted shaft core, and reference numeral "191" indicates a shape of a coupled portion formed by coupling of the coupling member 140 and the link device 190.

In a case where driven side projections 195 have a hemisphere shape, the driven side projection 195 forms an arc shape in which a rotating direction downstream end of the driven side projection 195, which is a groove abutting place abutting against a side surface of a driven side groove 142, is positioned to a rotating direction upstream side, as going to the top, as illustrated in FIG. 25C. As illustrated in FIGS. 25A through 25C, when the protruding direction of the driven side projections 195 is a direction perpendicular to a shaft center gap direction, nearly the entire driven side projections 195 enter the driven side grooves 142. Therefore, in this case, driven side spherical portion sides of the driven side projections 195 abut against side surfaces of the driven side grooves 142, as illustrated in FIG. 25C.

From this state, when a link device 190 is rotated in the arrow F direction in FIG. 25C, the left driven side projection 195 of FIG. 25C is moved in the driven side groove 142 in a shaft direction in a direction of being separated from a photoconductor gear, and the right driven side projection 195 of FIG. 25C is moved in the driven side groove 142 in the shaft direction in a direction of approaching the photoconductor gear. At this time, entering amounts of the driven side projections 195 to the driven side grooves 142 are decreased, and the abutting positions of the driven side projections 195 against the driven side groove side surfaces are changed to the top side. In the case where the driven side projections 195 have a hemisphere shape, the rotating direction downstream end of the driven side projection 195, which abuts against the driven side groove 142, is positioned to the rotating direction upstream side, as going to the top, as described above. Therefore, as illustrated in FIG. 26C, even if the link device 190 is rotated by an angle of 90 degrees, the coupling member 140 is not rotated by an angle of 90 degrees and is positioned in a position retracted in the rotating direction by δθ, and the angular speed of the coupling member 140 is delayed from the angular speed of the link device 190.

Then, when the link device 190 is further rotated in the arrow F direction in FIG. 26C from the state of FIGS. 26A through 26C, the driven side projection 195 positioned at an upper side in FIG. 26A is moved in the driven side groove 142 in the shaft direction to approach the photoconductor gear. Further, the driven side projection 195 positioned at a lower side in FIG. 26A is moved in the driven side groove 142 in the shaft direction in a direction away from the photoconductor gear. At this time, the abutting positions of the driven side projections 195 against the driven side groove side surfaces are changed from the top side to the driven side spherical portion sides. When the link device 190 is rotated by an angle of 90 degrees from the state of FIGS. 26A through 26C and rotated by an angle of 180 degrees in total, a state after the rotation becomes the same as the state of FIGS. 25A through 25C, except that the positions of the driven side projections 195 and the driven side grooves 142 are switched. At this time, the delay of the coupling member 140 is gone and is rotated by an angle of 180 degrees, similarly to the link device 190. That is, while the coupling member 140 is rotated by an angle of 90 degrees from the state of FIGS. 26A through 26C, the coupling member 140 is rotated more by the angle δθ, and the angular speed becomes faster than the link device 190. In this way, in the case where the driven side projections have a hemisphere shape, angular speed variation of a half (½) rotation period is caused.

In the above description, the speed variation between the link device 190 and the coupling member 140 has been described. However, in a case where drive side projections have a hemisphere shape, the link device 190 has speed variation of a half (½) period between the photoconductor gear and the link device 190.

Figure 27A:
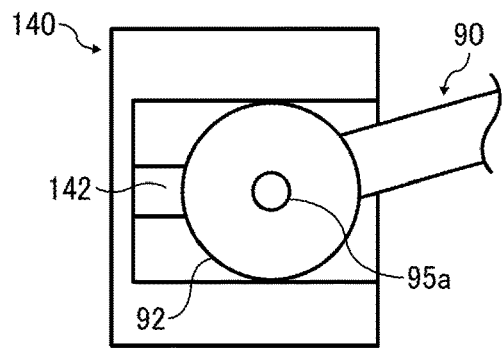
FIGS. 27A through 27C are diagrams for describing drive transmission of the link device and the coupling member of the present embodiment.
Figure 27B:
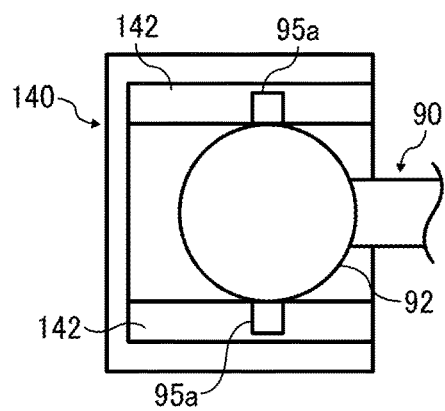
Figure 27C:
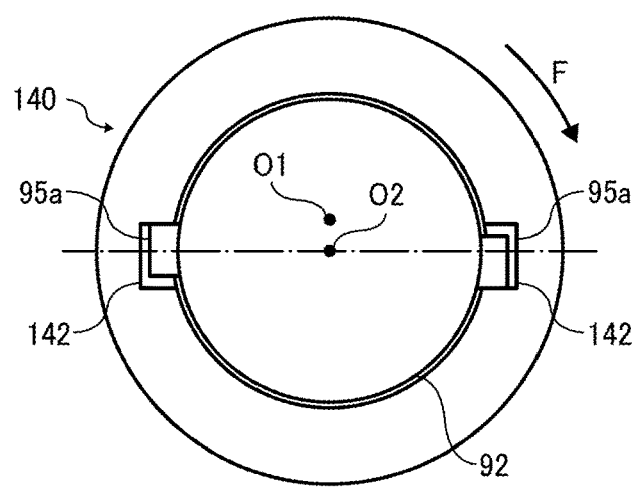
Figure 28A:
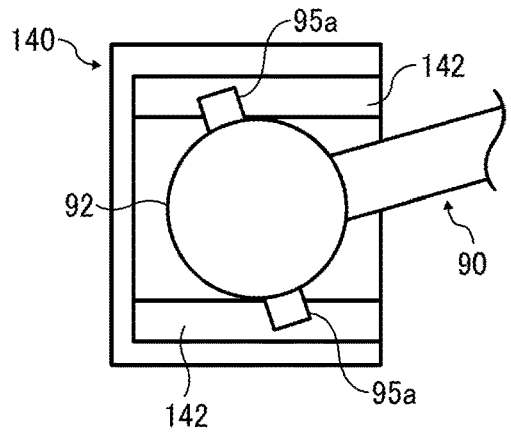
FIGS. 28A through 28C are diagrams illustrating a state rotated by an angle of 90 degrees from the state of FIGS. 27A through 27C according to an embodiment of this disclosure.
Figure 28B:
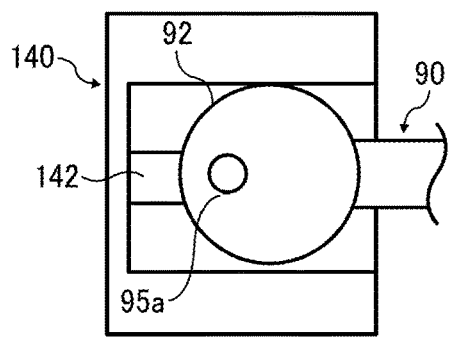
Figure 28C:
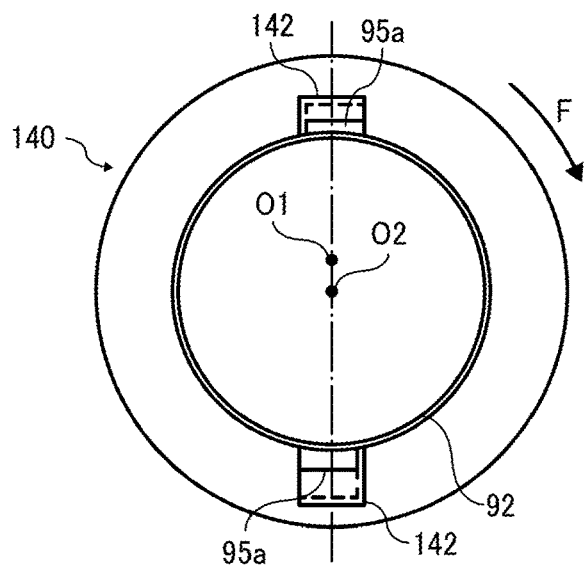

FIGS. 27A through 27C are diagrams for describing drive transmission between the link device 90 and the coupling member 140 of the present embodiment. FIG. 27A is a schematic view as viewed from a direction perpendicular to the inclined direction of the link device 90. FIG. 27B is a schematic view as viewed from above FIG. 27A. FIG. 27C is a schematic view as viewed from the shaft direction. Further, FIGS. 28A through 28C are diagrams illustrating a state rotated by an angle of 90 degrees from the state of FIGS. 27A through 27C. FIG. 28A is a schematic view as viewed from the direction perpendicular to the inclined direction of the link device 90. FIG. 28B is a schematic view as viewed from above FIG. 28A. FIG. 28C is a schematic view as viewed from the shaft direction.

It is to be noted that, in FIGS. 25A, 25B, 25C, 26A, 26B, and 26C, the reference letter "O2" indicates the shaft core of the coupling member 140, the reference letter "O1" indicates the shifted shaft core, and reference numeral "191" indicates the shape of the coupled portion formed by coupling of the coupling member 140 and the link device 190.

In the present embodiment, the driven side projections 95a have a columnar shape. Accordingly, as illustrated in FIG. 27C, rotating direction downstream side ends of the driven side projections 95a as groove abutting places abutting against side surfaces of the driven side grooves 142 have a linear shape linearly extending in the radial direction. As a result, the places abutting against the driven side grooves 142, of the driven side projections 95a, remain at the same positions in the rotating direction from the driven side spherical portion 92 side to the top. When the link device 90 is rotated in the arrow F direction in FIG. 27C from the state illustrated in FIGS. 27A through 27C, entering amounts of the driven side projections 95a to the driven side grooves 142 are decreased. When the link device 90 is rotated by an angle of 90 degrees, as illustrated in FIG. 28C, the top sides of the driven side projections 95a enter the driven side grooves 142. As a result, the rotating direction downstream side ends of the tops of the driven side projections 95a abut against the side surfaces of the driven side groove 142. However, the rotating direction downstream side ends of the driven side projections 95a have a linear shape linearly extending in the radial direction. Therefore, even if only the rotating direction downstream side ends of the tops of the driven side projections 95a abut against the side surfaces of the driven side grooves 142, the coupling member 140 is rotated by the same angle as the link device 90 without being delayed from the rotation of the link device 90. Accordingly, even if there is the shaft center gap, the coupling member 140 can be rotated at a constant speed.

Similarly, the drive side projections 94a and 94b have a columnar shape, and thus the link device 90 can be rotated at a constant speed without causing the speed variation in the drive transmission from the photoconductor gear 82 to the link device 90.

Further, in the present embodiment, the drive side projections 94a and 94b and the driven side projections 95a have columnar shapes. Therefore, the rotating direction downstream side ends as groove abutting places abutting against the side surfaces of the grooves 85 and 142 have arc surfaces protruding in the rotating direction. As a result, as viewed from the radial direction, the abutting between the projections 94a, 94b, and 95a and the grooves 85 and 142 becomes point connection, and the link device 90 can be smoothly inclined in the direction perpendicular to the protruding direction of the projections 94a, 94b, and 95a, as illustrated in FIG. 27A. It is to be noted that the point connection is an ideal state in design, and includes, in reality, a state having some contact width.

Figure 29:
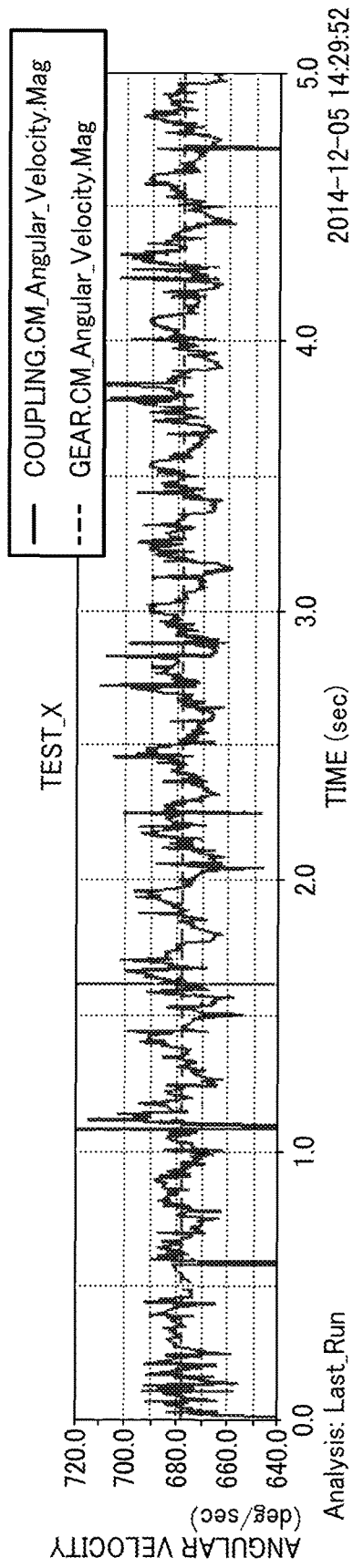
FIG. 29 is a graph illustrating speed variation of a photoconductor drum checked when a shaft center of a drum shaft is shifted from a rotating shaft of a photoconductor gear by a predetermined amount in a known configuration.

FIG. 29 is a graph illustrating speed variation of a photoconductor checked when a shaft center of a photoconductor shaft 2a is shifted from a rotating shaft of a photoconductor gear by a predetermined amount, using a comparative link with drive side projections and the driven side projections having hemisphere shapes. As illustrated in FIG. 29, it is found that the speed variation is caused in the photoconductor with a predetermined period.

Figure 30:
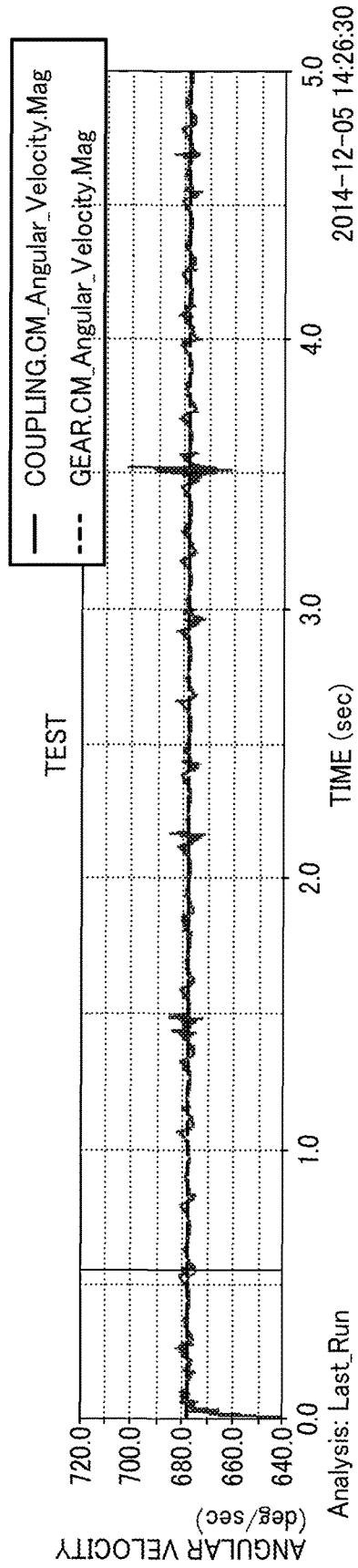
FIG. 30 is a graph illustrating speed variation of a photoconductor drum checked when a shaft center of a drum shaft is shifted from a rotating shaft of a photoconductor gear by a predetermined amount in a configuration of the present embodiment.

FIG. 30 is a graph of the speed variation of the photoconductor 2 checked when the shaft center of the photoconductor shaft 2a is shifted from the rotating shaft of the photoconductor gear by a predetermined amount, using the link of the present embodiment with the drive side projections and the driven side projection having columnar shapes. As illustrated in FIG. 30, it is found that the speed variation of the photoconductor 2 can be sufficiently restrained, compared with the known configuration.

Figure 31:
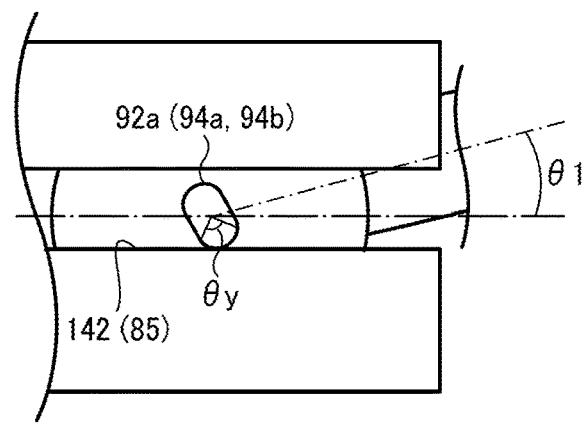
FIG. 31 is a diagram illustrating a variation of a drive side projection and a driven side projection according to an embodiment of this disclosure.

Further, the drive side projections 94a and 94b and the driven side projections 95a may have any shapes as long as the groove abutting places at least abutting against the side surfaces of the grooves (i.e. the grooves 142 and 85) linearly extend in the radial direction and protrude in the rotating direction. Therefore, for example, the projections 94a, 94b and 95a may have a columnar shape having a rectangular shape with rounded corners in cross section, or a columnar shape having an elliptical shape in cross section, as illustrated in FIG. 31.

Further, in a case where the groove abutting place of the projection (i.e., any one of the projections 95a, 94a, and 94b), which abuts against the side surface of the groove (i.e., any one of the grooves 42 and 85), has an arc surface, a center angle θy of the arc is set to twice the maximum inclination angle θ1 of the link device 90 in the direction perpendicular to the protruding direction of the projection (i.e., any one of the projections 95a, 94a, and 94b). Accordingly, even if the link device 90 is inclined by the maximum inclination angle θ1, the arc surface of the projection (i.e., any one of the projections 95a, 94a, and 94b) can abut against the side surface of the groove (i.e., any one of the grooves 42 and 85). Accordingly, even if the link device 90 is inclined by the maximum inclination angle θ1, the contact between the groove (i.e., any one of the grooves 42 and 85) and the projection (i.e., any one of the projections 95a, 94a, and 94b) as viewed from the protruding direction of the projection (i.e., any one of the projections 95a, 94a, and 94b) can be the point connection, and the link device 90 can be smoothly inclined.

Next, modifications of the drive transmission device 70 will be described.

Figure 32:
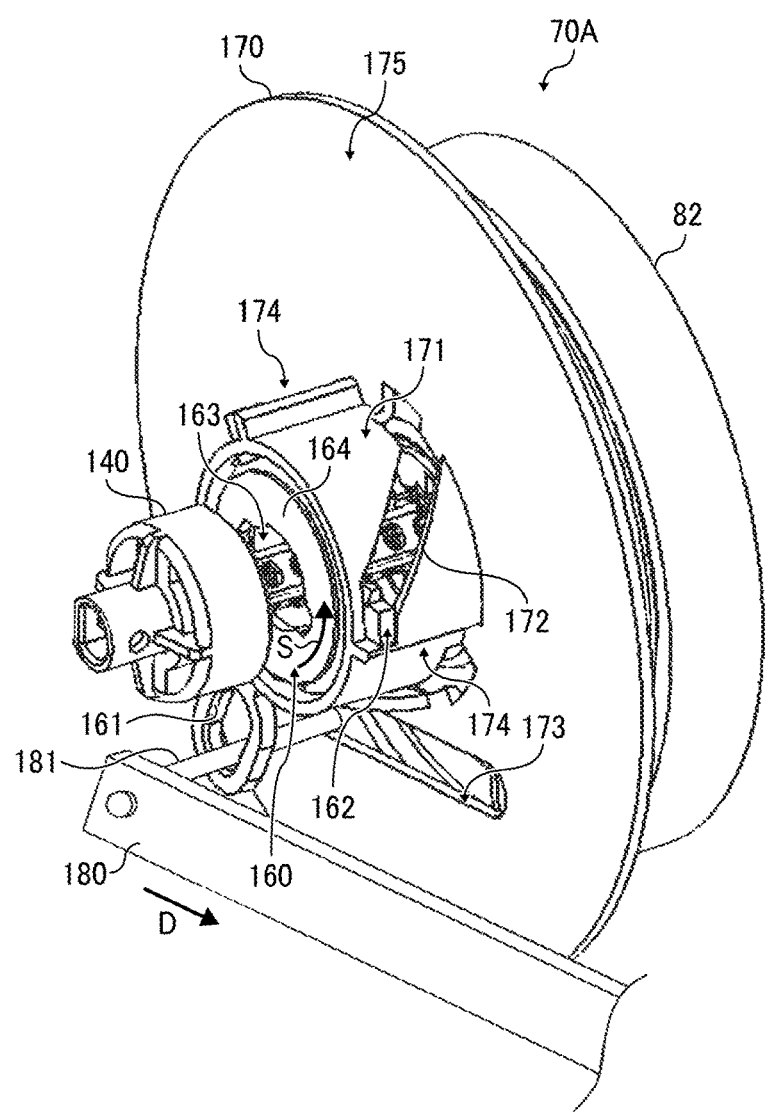
FIG. 32 is a perspective view of a drive transmission device of the variation according to an embodiment of this disclosure.
Figure 33:
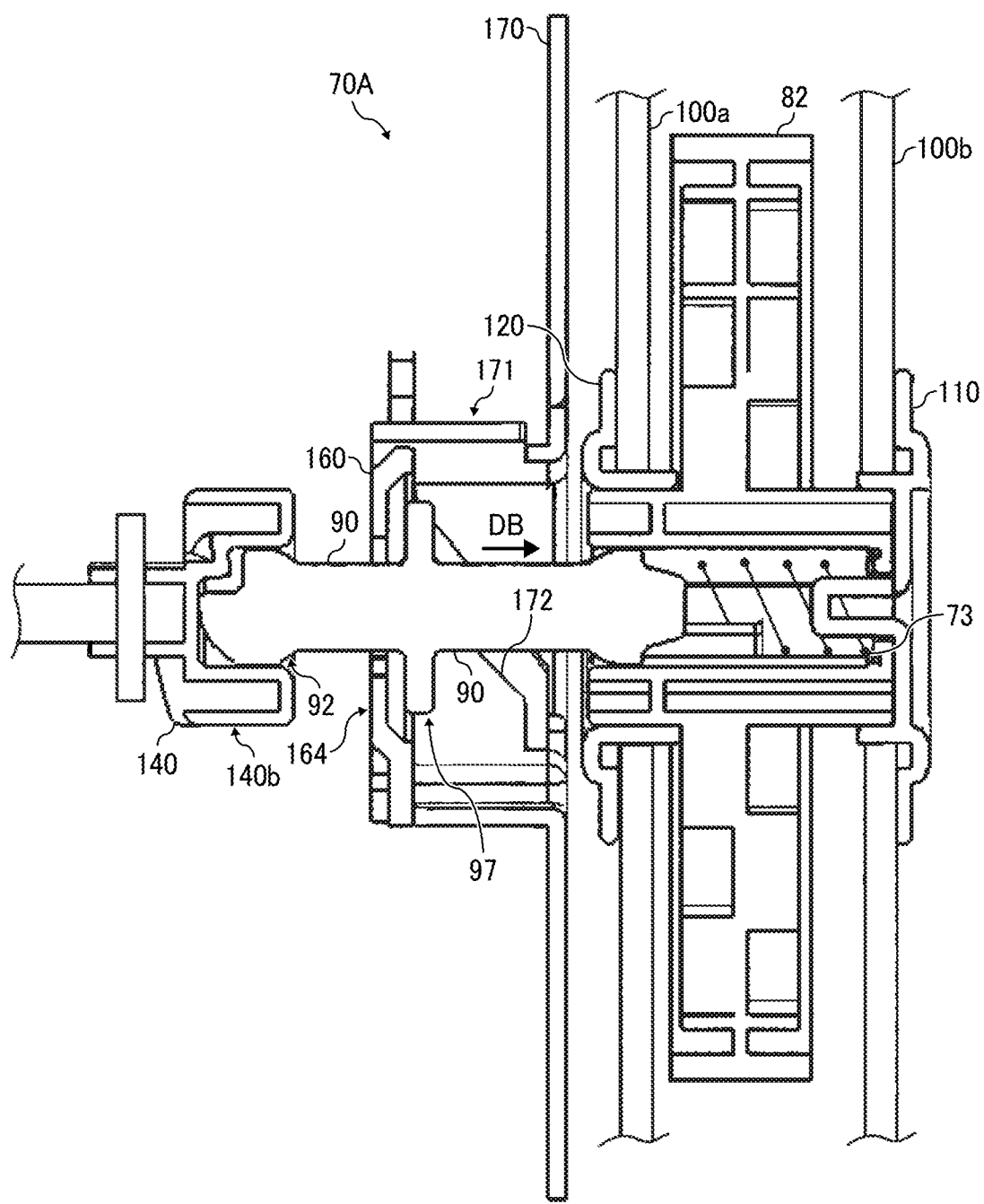
FIG. 33 is a cross-sectional view of the drive transmission device of the variation according to an embodiment of this disclosure.

FIG. 32 is a perspective view of a drive transmission device 70A of a modification, and FIG. 33 is a cross-sectional view of the drive transmission device 70A of the modification.

The drive transmission device 70A of the modification includes a rotary releasing member 160 that is rotated, and a retainer 170 that holds the rotary releasing member 160. The retainer 170 includes a disc shaped portion 175, and a cylindrical portion 171 provided in the center of the disc shaped portion 175, and the rotary releasing member 160 is rotatably held in the cylindrical portion 171.

Further, cuts 172 are formed in three places of the cylindrical portion 171 in a circumferential direction, the cut 172 being positioned toward a photoconductor gear 82 side as going downstream in a counterclockwise direction in FIG. 31.

Figure 34:
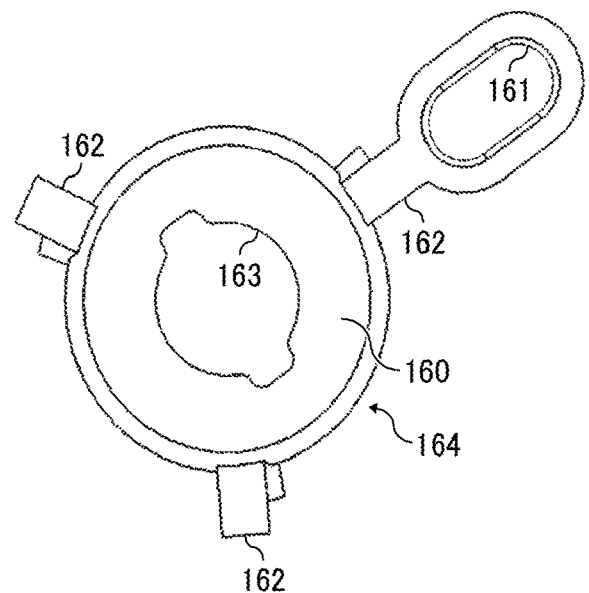
FIG. 34 is a front view of a rotary releasing member according to an embodiment of this disclosure.

FIG. 34 is a front view of the rotary releasing member 160.

The rotary releasing member 160 includes a flat face portion 164 perpendicular to a shaft direction, and a through opening portion 163 that a link device 90 penetrates is formed in the center of the flat face portion 164. Further, guide portions 162 protruding in a radial direction are included in three places of an outer periphery of the rotary releasing member 160 at equal intervals in a rotating direction. One of the three guide portions 162 is provided with an attaching opening portion 161 that an attaching projection 181 of a releasing lever 180 penetrates.

As illustrated in FIG. 32, the guide portions 162 of the rotary releasing member 160 penetrate the cuts 172 of the retainer 170. Further, abutting portions 174 against which the guide portions 162 abut are formed in a counterclockwise direction upstream side end portions of the respective cuts 172 in FIG. 32.

Further, as illustrated in FIG. 32, a releasing lever guide opening 173 extending in the arrow D direction in FIG. 32 is formed below the cylindrical portion 171 of the disc shaped portion 175 of the retainer 170.

As illustrated in FIG. 32, when the drive link between the link device 90 and a coupling member 140 is not released, the attaching projection 181 of the releasing lever 180 is positioned in an upstream side end portion in the arrow D direction, of the releasing lever guide opening 173. Further, at this time, the flat face portion 164 of the rotary releasing member 160 faces a pressing target portion 97 of the link device 90 with a predetermined gap, as illustrated in FIG. 33.

Figure 35:
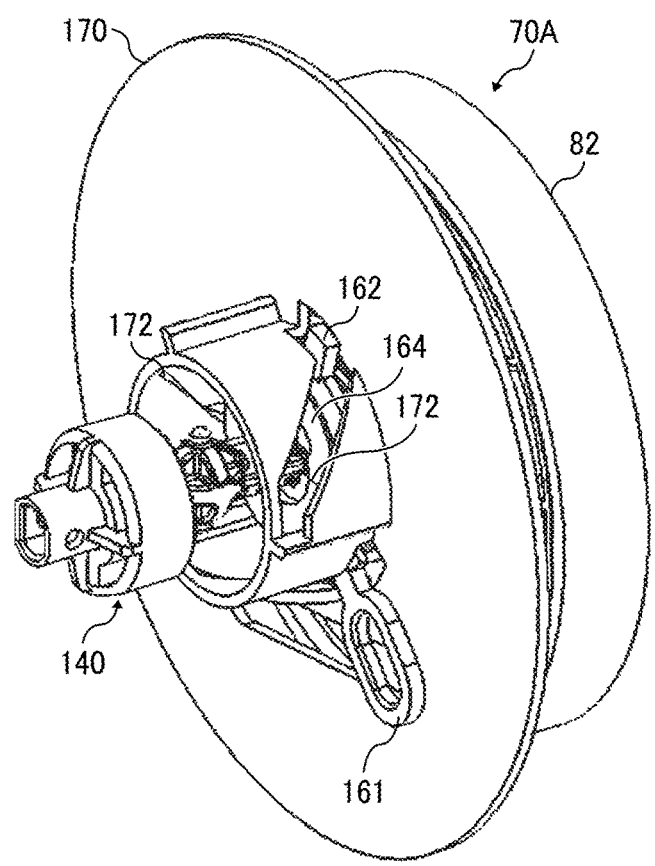
FIG. 35 is a perspective view of the drive transmission device of the modification, illustrating a state in which a link is retracted to a release position according to an embodiment of this disclosure.
Figure 36:
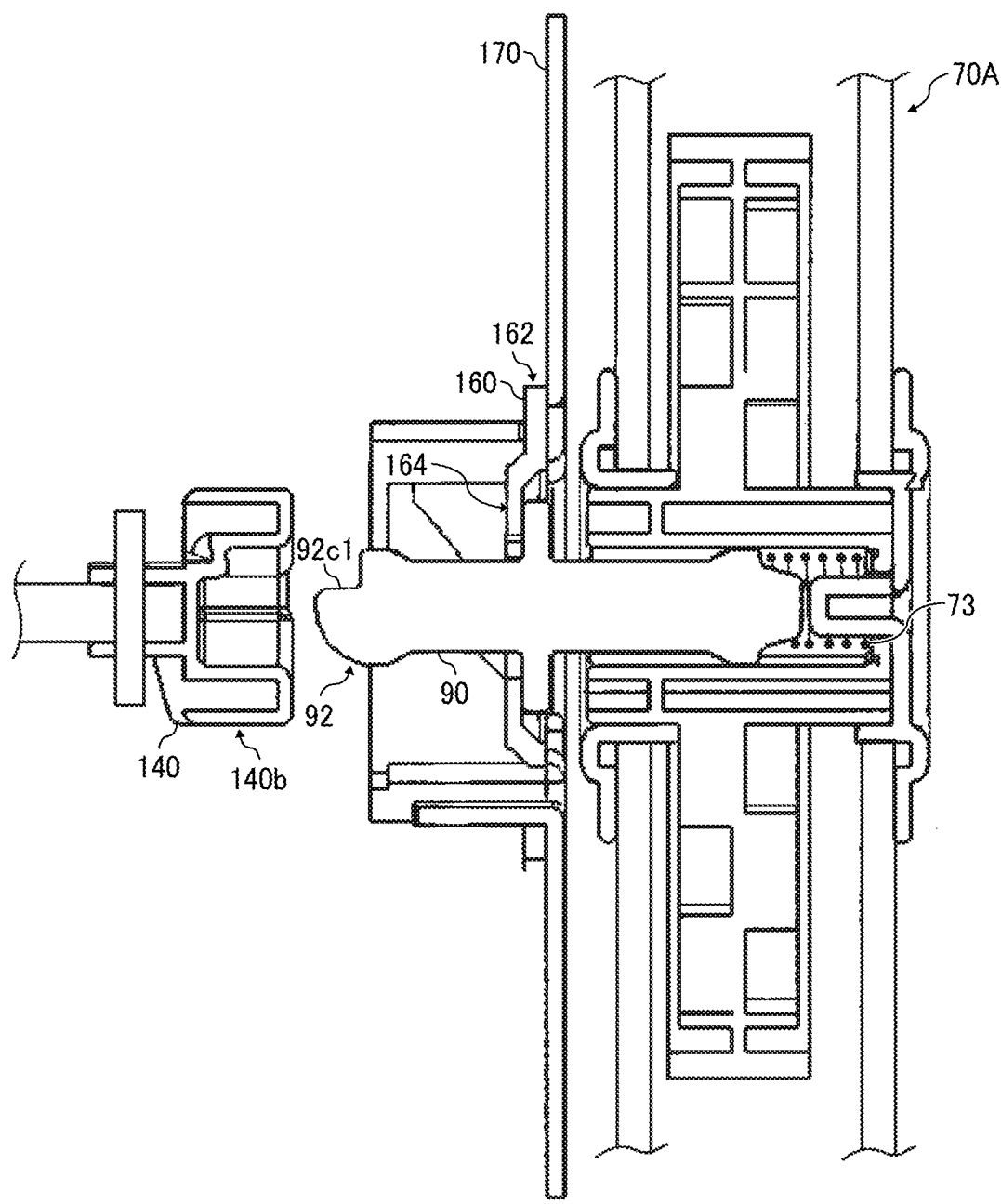
FIG. 36 is a cross-sectional view of the drive transmission device of the modification, illustrating the state in which a link device is retracted to a release position according to an embodiment of this disclosure.

FIG. 35 is a perspective view of the drive transmission device 70A of the modification, illustrating a state in which the link device 90 is retracted to a release position. FIG. 36 is a cross-sectional view of the drive transmission device 70A of the modification, illustrating the state in which the link device 90 is retracted to a release position. It is to be noted that, in FIGS. 35 and 36, illustration of the releasing lever is omitted.

When the releasing lever 180 is moved in the arrow D direction in FIG. 32, in conjunction with movement of an intermediate cover 102 to an open position, the attaching projection 181 of the releasing lever 180 pushes the attaching opening portion 161 in the arrow D direction in FIG. 32. Then, the rotary releasing member 160 is rotated in the arrow S direction in FIG. 32 (in a counterclockwise direction in FIG. 32). When the rotary releasing member 160 is rotated, the guide portions 162 of the rotary releasing member 160 are guided by the cuts 172, and the rotary releasing member 160 is moved to the photoconductor gear 82. Then, the flat face portion 164 of the rotary releasing member 160 abuts against the pressing target portion 97 of the link device 90. Further, when the releasing lever 180 is moved in the arrow D direction, the rotary releasing member 160 is further moved toward the photoconductor gear 82 side while being rotated, and the flat face portion 164 pushes the pressing target portion 97 to the photoconductor gear 82 side. Accordingly, the link device 90 is moved toward the photoconductor gear 82 side against biasing force of a coil spring 73. Then, as illustrated in FIG. 35, when the guide portions 162 are moved to downstream side end portions in a rotary direction of the rotary releasing member 160, of the cuts 172, a driven side spherical portion 92 is pulled out from a driven side cylindrical portion 140b of the coupling member 140, as illustrated in FIG. 36. Accordingly, drive link between the link device 90 and the coupling member 140 is released, and the link device 90 is retracted toward the photoconductor gear 82 side.

Accordingly, a process unit 1 can be moved in the direction perpendicular to the shaft direction, and can be pulled out from a housing 100. Further, when the process unit 1 is attached to the housing 100, the link device 90 is retracted to the photoconductor gear 82 by the rotary releasing member 160. Therefore, when the process unit 1 is attached to the housing 100, the process unit 1 can be attached without causing a collision of the coupling member 140 with the driven side spherical portion 92 of the link device 90.

In the above description, an embodiment used for the drive transmission to the photoconductor 2 has been described. However, the embodiment can be used for a fixing unit, a developing unit, a transfer unit, and the like. By using the drive transmission device (i.e., any one of the drive transmission devices 70 and 70A) of the present embodiment or the variation, these units can be attached to and detached from a housing in a direction perpendicular to a rotating shaft direction.

This configurations according to the above-descried embodiments are not limited thereto. This disclosure can achieve the following aspects effectively.

Aspect 1.

A drive transmission device (for example, the drive transmission device 70) includes a first drive transmitter (for example, a photoconductor gear 82), a second drive transmitter (for example, the coupling member 140), a link device (for example, the link device 90), projections (for example, the drive side projections 94a and 94b, and driven side projections 95a), grooves (for example, the drive side groove 85 and the driven side groove 142), and a releasing device (for example, the releasing device 300). The first drive transmitter includes a first opening (for example, the driving side cylindrical portion 82a) in a rotation center. The second drive transmitter includes a second opening (for example, the driven side cylindrical portion 140b) in a rotation center. The link device includes a first inserting body (for example, the driving side spherical portion 91) having a spherical shape to be inserted into the first opening of the first drive transmitter, a second inserting body (for example, the driven side spherical portion 92) having a spherical shape to be inserted into the second opening of the second drive transmitter, and a link body (for example, the linking member 93) that links the first inserting body and the second inserting body, and adapted to link the first drive transmitter and the second drive transmitter. The projections protrude in a radial direction, on peripheral surfaces of the inserting bodies. The grooves in which the projections of the link are movable in a shaft direction, in inner peripheral surfaces of the first and second openings of the first and second drive transmitters, wherein the second drive transmitter is provided in a shaft end portion of a rotary body (for example, a photoconductor 2) attachable to and detachable from a housing of an image forming apparatus (for example, the image forming apparatus 1000). The releasing device relatively moves the link device in the shaft direction with respect to the second drive transmitter in a state in which the rotary body is attached to the housing to release drive link between a rotary body side and a housing side is included.

According to this configuration, the drive link between the housing side and the rotary body side is released in the state where the rotary body (for example, the photoconductor 2) is attached to the housing. To be specific, in a case in which the link device is provided in the rotary body side, the link device is relatively moved toward the rotary body side with respect to the second drive transmitter (for example, the coupling member 140), so that the first inserting body (for example, the driving side spherical portion 91) is pulled out from the first opening (for example, the driving side cylindrical portion 82$a$) of the first drive transmitter (for example, the photoconductor gear 82), and the drive link between the housing side and the rotary body side is released. Further, in a case in which the link device is provided in the housing side, the link device is relatively moved toward the first drive transmitter side with respect to the second drive transmitter, so that the second inserting body such as the driven side spherical portion is pulled out from the second opening such as the driven side cylindrical portion of the second drive transmitter, and the drive link between the housing side and the rotary body side is released. Accordingly, the rotary body can be attached to and detached from the housing in the direction perpendicular to the rotating shaft direction of the rotary body.

Further, the second drive transmitter is provided in the shaft end portion of the rotary body, so that the number of components can be reduced and cost reduction of the device can be achieved, compared with the drive transmission device described in a known technique, in which the second drive transmitter is provided in the housing side, and a third drive transmitter such as the driven side coupling to be engaged with the second drive transmitter is provided in the end portion of the rotary body.

Aspect 2.

In Aspect 1, the releasing device includes a biasing body (for example, the coil spring 73) that biases the link device toward the second drive transmitter side (for example, the coupling member 140), a pressing target portion (for example, the pressing target portion 97) provided in the link body (for example, the linking member 93) of the link device, and a pressing unit (for example, the releasing member 60) that abuts against the pressing target portion to push the link device toward the first drive transmitter side such as the photoconductor gear.

According to this configuration, the pressing target portion of the link device is pushed by the pressing unit (for example, the releasing member 60), and the link device is moved toward the first drive transmitter side (for example, the photoconductor gear 82) against biasing force of the biasing body (for example, the coil spring 73). Accordingly, the second inserting body (for example, the driven side spherical portion 92) can be pulled out from the second opening (for example, the driven side cylindrical portion 140$b$) of the second drive transmitter (for example, the coupling member 140), and the drive link between the second drive transmitter and the link device can be released. When the pushing by the pressing unit is released, the link device is moved toward the second drive transmitter by the biasing force of the biasing body, and the second inserting body can be brought to enter the second opening of the second drive transmitter, and the drive link between the link device and the second drive transmitter can be performed.

Aspect 3.

In Aspect 2, the pressing target portion (for example, the pressing target portion 97) has a disc shape.

According to this configuration, as described in the embodiment, the pressing target portion of the link device can be stably pushed in a rotation position of the link device without changing an abutting state between the pressing unit and the pressing target portion.

Aspect 4.

In Aspect 2 or Aspect 3, the projections (for example, the drive side projections 94$a$ and 94$b$) included in the first inserting body (for example, the driving side spherical portion 91) inserted into the first opening (for example, the driving side cylindrical portion 82$a$) of the first drive transmitter (for example, the photoconductor gear 82) are positioned in the grooves (for example, the drive side grooves 85) inside the first opening, a maximum outer diameter of the pressing target portion (for example, the pressing target portion 97) is made larger than an inner diameter of the first opening of the first drive transmitter, and a shaft direction length from the projections (for example, the driven side projections 95$a$) included in the second inserting body (for example, the driven side spherical portion 92) to the pressing target portion is made shorter than a length from a second drive transmitter side end portion (for example, the coupling member 140 side end portion) in the first opening of the first drive transmitter to a place where the projections can be positioned in the grooves in the first opening of the first drive transmitter (in the present embodiment, the communicating portion 84 that allows the guide grooves and the drive side grooves to communicate).

According to this configuration, as described in the embodiment, when the second inserting body such as the driven side spherical portion is wrongly inserted into the first opening (for example, the driving side cylindrical portion 82$a$) of the first drive transmitter (for example, the photoconductor gear 82), the pressing target portion collides with the second drive transmitter side end portion in the first opening of the first drive transmitter, before the projections of the second inserting body (for example, the driven side projections 95$a$) reaches the place where the projections in the first opening of the first drive transmitter (for example, the communicating portion 84) can be positioned in the grooves. Accordingly, the projections cannot be positioned in the grooves, and the link device cannot be assembled to the first drive transmitter. Therefore, wrong attachment of the link device can be prevented.

Aspect 5.

In any of Aspect 1 through Aspect 4, the inserting bodies such as the driving side spherical portion 91 and the driven side spherical portion 92 have a lightened spherical shape, leaving large circles (for example, the first drive side large circle 91$a$ and the first driven side large circle 92$a$) perpendicular to an X direction of the sphere, large circles (for example, the third drive side large circle 91$c$ and the third driven side large circle 92$c$) perpendicular to a Y direction of the sphere, and large circles (for example, the second drive side large circle 91$b$ and the second driven side large circle 92$b$) perpendicular to a Z direction of the sphere, where the shaft direction is the X direction, a specific direction of directions perpendicular to the X direction is the Y direction, and a direction perpendicular to the X direction and the Y direction is the Z direction.

According to this configuration, as described with reference to FIGS. 11A through 11D, the sink marks of the inserting bodies can be restrained, and the inserting bodies can be accurately molded. Further, the link device can be molded using a first mold (for example, the first mold 391)

moved in one direction (i.e., the Y1 direction) and a second mold (for example, the second mold 392) moved in an opposite direction to the first mold 391, and the number of molds can be reduced, compared with the configuration to light the insides of the inserting bodies, illustrated in FIGS. 10A through 10C. Further, even if a link body (for example, the linking member 93) of the link device is long, the inserting bodies can be uniformly lightened. Accordingly, even if the linking member of the link device is long, the sink marks of the inserting bodies can be favorably restrained, and the inserting bodies can be accurately molded. Further, the diameter of the link body can be made smaller than the configuration to lighten the insides of the inserting bodies, and downsizing of the link device 90 can be achieved.

Aspect 6.

In Aspect 5, the link body (for example, the linking member 93) has a shape in which a lightening portion having a cross shape in cross section made of a linear portion extending in the Y direction and a linear portion extending in the Z direction, and a reinforcing portion having a square shape in cross section are alternately formed in the X direction.

According to this configuration, as described in the embodiment, the lightening of the link body can be performed using the first mold and the second mold, the sink marks of the link body can be restrained, and the link body can be accurately molded.

Aspect 7.

In any of Aspect 1 through Aspect 6, a phase matching device (for example, the first phase matching device 210 and the second phase matching device 220) that matches phases in a rotating direction, of the first drive transmitter (for example, the photoconductor gear 82) and the second drive transmitter (for example, the coupling member 140) is included.

According to this configuration, as illustrated in the embodiment, speed variation of the rotary body, which is caused by speed variation of one rotation period of the first drive transmitter and speed variation of one rotation period of the rotary body (for example, the photoconductor 2) attached to the same shaft as the second drive transmitter, can be made the same on a constant basis. Accordingly, it is not necessary to take data for restraint control of the speed variation of the rotary body (measurement of the speed variation of one rotation of the rotary body, using an encoder or the like), or to take data for restraint control of out of color registration (grasping the degree of the out of color registration by forming a patch pattern and detecting the patch pattern with an optical sensor) in every attachment and detachment of the rotary body, and the control of the device can be simplified.

Aspect 8.

In Aspect 7, the phase matching device includes a first phase matching device (in the present embodiment, the first phase matching device 210 that is configured by the second drive side projection 94b and the second guide groove 86b) that matches the phases in the rotating direction, of the link device and the first drive transmitter (for example, the photoconductor gear 82), and a second phase matching device (in the present embodiment, the second phase matching device 220 that is configured by the driven side spherical portion 92 and a phase matching projection 144) that matches the phases of the link device and the second drive transmitter (for example, the coupling member 140).

According to this configuration, the link device is attached to the first drive transmitter at a predetermined phase in the rotating direction. Then, the second drive transmitter is attached to the link device at a predetermined phase, the link device having been attached to the first drive transmitter at a predetermined phase. Accordingly, the first drive transmitter and the second drive transmitter can be linked at the predetermined phases through the link device.

Aspect 9.

In Aspect 8, at least one of the first phase matching device (for example, the first phase matching device 210) and the second phase matching device (for example, the second phase matching device 220) is configured from a phase matching projection (for example, the second drive side projection 94b) protruding from the peripheral surface of the inserting body in the radial direction, and a phase matching groove (for example, the second guide groove 86b) into which the phase matching projection is inserted, when the inserting body having the phase matching projection is inserted into the opening of the drive transmitter into which the inserting body is inserted, and a shape of the phase matching projection is differentiated from a shape of the projection (for example, the first drive side projection 94a), and a shape of the phase matching groove is differentiated from a shape of the groove (for example, the first guide groove 86a) into which the projection is inserted when the inserting body is inserted into the opening, so that the phase matching projection is insertable into the phase matching groove.

According to this configuration, as described in the embodiment, when the link device (for example, the link device 90) and the first drive transmitter (for example, the photoconductor gear 82) are at a predetermined phase, the phase matching projection (for example, the second drive side projection 94b) having a different shape from the projection (for example, the first drive side projection 94a) can be inserted into the phase matching groove (for example, the second guide groove 86b), and the phases of the link device and the first drive transmitter can be matched with a predetermined phase.

It is to be noted that "different shape" here refers to different shape or different size (non-congruence).

Aspect 10.

In Aspect 8 or Aspect 9, at least one of the first phase matching device and the second phase matching device is configured from a projection portion (for example, the phase matching projection 144) protruding in the shaft direction and provided in a bottom surface of an opening (for example, the driven side opening 143), and a cut (the cut portion 92c1 in the third driven side large circle 92c) formed in the inserting body to allow the inserting body (for example, the driven side spherical portion 92) not to be in contact with the projection portion when the inserting body is inserted into the opening.

According to this configuration, when the second drive transmitter (for example, the coupling member 140) and the link device (for example, the link device 90) are at a predetermined phase, the projection portion (for example, the phase matching projection 144) enters the cut that is the cut portion 92c1 in the third driven side large circle 92c of the inserting body (for example, the driven side spherical portion 92), and the inserting body (for example, the driven side spherical portion 92) of the link device can be inserted into the opening of the second drive transmitter, and the drive link between the link and the second drive transmitter can be performed.

Aspect 11.

In any of Aspect 1 through Aspect 10, a stopper (for example, the stopper 85a) that stops pulling out of the projections (for example, the drive side projections 94a and 94b) from the grooves is included in the grooves of the first drive transmitter (for example, the drive side grooves 85), and an opening in a position different from a formation position of the grooves in a rotating direction, guide grooves (for example, the guide grooves 86a and 86b) extending in the shaft direction and which guide the projections into the first opening when the first inserting body is inserted into the first opening, and a communicating portion (for example, the communication portion 84) that allows the guide grooves and the grooves to communicate into each other are included in the first opening of the first drive transmitter (for example, the driving side cylindrical portion 82a).

According to this configuration, when the link device is moved toward the second drive transmitter, the projections (for example, the drive side projections 94a and 94b) abut against the stopper (for example, the stopper 85a), and the first inserting body (for example, the driving side spherical portion 91), of the link device (for example, the link device 90), can be prevented from being pulled out from the first drive transmitter (for example, the photoconductor gear 82).

Further, the projections are inserted into the guide grooves (for example, the guide grooves 86a and 86b) until the projections are positioned to the communicating portion between the guide grooves and the grooves. Then, the link device (for example, the link device 90) is rotated, so that the projections in the guide grooves can be moved to the first groove through the communicating portion, and the projection can be positioned in the grooves in the first opening. Even if the stopper is integrally molded with the first drive transmitter, the projections can be positioned to the grooves, and the first inserting body can be inserted into the first opening. Accordingly, the number of components can be reduced, compared with a configuration to provide a stopper member as a separate member from a first drive transmitter, attach a link to the first drive transmitter, and then assemble the stopper member to the first drive transmitter. Accordingly, cost reduction of the device and reduction of assembly man-hours can be achieved.

Aspect 12.

In Aspect 11, a regulator (for example, the regulating projection 112) that regulates movement of the projections (for example, the drive side projections 94a and 94b) to the guide grooves (for example, the guide grooves 86a and 86b) from the grooves (for example, the drive side grooves 85) through the communicating portion (for example, the communicating portion 84) is provided.

According to this configuration, as described in the embodiment, the projections (for example, the drive side projections 94a and 94b) inserted into the grooves (for example, the drive side grooves 85) can be prevented from being moved to the guide grooves from the grooves (such as the drive side grooves 85) through the communicating portion. Accordingly, the link can be prevented from being pulled out from the drive transmitter such as the photoconductor gear.

Aspect 13.

In any of Aspect 1 through Aspect 12, a groove abutting place abutting against the grooves at the time of drive transmission of the projections protrudes in a rotating direction, and has a shape linearly extending in the radial direction.

According to this configuration, rotation speed variation can be restrained, as described with reference to FIGS. 25A through 25C to FIGS. 28A through 28C.

Aspect 14.

An image forming apparatus includes the drive transmission device according to any one of Aspect 1 through Aspect 13.

According to this configuration, rotating speed variation of the rotary body (for example, the photoconductors 2 and the like), which is transmitted from the drive transmission device, can be restrained, and a favorable image can be formed. Further, cost reduction of the image forming apparatus can be achieved.

Aspect 15.

In Aspect 14, the rotary body (for example, the photoconductor 2) is attachable and detachable in a direction perpendicular to a shaft of the rotary body.

Accordingly, in the shaft direction of the rotary body, it is not necessary to secure a space for attachment and detachment of the rotary body, and thus downsizing of the device can be achieved in the shaft direction of the rotary body.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A drive transmission device comprising:
   a first drive transmitter having a first hollow body in a rotation center;
   a second drive transmitter having a second hollow body in a rotation center;
   a link device configured to link the first drive transmitter and the second drive transmitter, the link device including,
      a first inserting body having a spherical shape and a peripheral surface on which a projection protruding in a radial direction is formed, the first inserting body configured to be inserted into the first hollow body of the first drive transmitter,
      a second inserting body having a spherical shape and a peripheral surface on which a projection protruding in a radial direction is formed, the second inserting body configured to be inserted into the second hollow body of the second drive transmitter, and
      a link body configured to link the first inserting body and the second inserting body; and
   a releasing device configured to relatively move the link device to the second drive transmitter in an axial direction and release a link of a driving force between a rotary body and a housing of an image forming apparatus, wherein
      the first drive transmitter has a groove formed in an inner peripheral surface of the first hollow body in which the projection of the first inserting body of the link device moves in an axial direction,
      the second drive transmitter has a groove formed in an inner peripheral surface of the second hollow body in which the projection of the second inserting body of the link device moves in the axial direction, the second drive transmitter being disposed at an end portion of a shaft of a rotary body detachably attached to the housing of the image forming apparatus, the first inserting body and the second inserting body includes a spherical portion having a lightened spherical shape, leaving a first large circle perpendicular to an X direction of the spherical portion, a second large circle perpendicular to a Y direction of the spherical portion, and a third large circle perpendicular to a Z direction of the spherical portion, where the X direction represents the axial direction, the Y direction represents a specific direction of directions perpendicular to the X direction, and the Z direction represents a direction perpendicular to both the X direction and the Y direction, and the link body has a shape in which a lightened portion of a cross shape in cross section including a linear portion extending in the Y direction and a linear portion extending in the Z direction, and a reinforcing portion having a square shape in cross section are alternately formed in the X direction.

2. The drive transmission device according to claim 1, wherein the releasing device includes:

a biasing body configured to bias the link device toward the second drive transmitter;

a pressing target portion provided in the link body of the link device; and a pressing body configured to contact the pressing target portion and press the link device toward the first drive transmitter.

3. The drive transmission device according to claim 2, wherein the pressing target portion has a disc shape.

4. The drive transmission device according to claim 2, wherein the projection of the first inserting body inserted into the first hollow body of the first drive transmitter is positioned in the groove inside the first hollow body, wherein an outer diameter of the pressing target portion is greater than an inner diameter of the first hollow body of the first drive transmitter, and wherein an axial length from the projection formed on the peripheral surface of the second inserting body to the pressing target portion is smaller than a length from the first drive transmitter at an end portion of the first hollow body closer to the second drive transmitter to a communication portion where the projection is positioned in the groove inside the first hollow body of the first drive transmitter.

5. The drive transmission device according to claim 1, further comprising:

a phase matching device configured to match a phase in a direction of rotation of the first drive transmitter and a phase in a direction of rotation of the second drive transmitter.

6. The drive transmission device according to claim 5, wherein the phase matching device includes:

a first phase matching device configured to match a phase in a direction of rotation of the link device and the phase in the direction of rotation of the first drive transmitter; and a second phase matching device configured to match the phase in the direction of rotation of the link device and the phase in the direction of rotation of the second drive transmitter.

7. A drive transmission device comprising:

a first drive transmitter having a first hollow body in a rotation center;

a second drive transmitter having a second hollow body in a rotation center;

a link device configured to link the first drive transmitter and the second drive transmitter, the link device including, a first inserting body having a spherical shape and a peripheral surface on which a projection protruding in a radial direction is formed, the first inserting body configured to be inserted into the first hollow body of the first drive transmitter, a second inserting body having a spherical shape and a peripheral surface on which a projection protruding in a radial direction is formed, the second inserting body configured to be inserted into the second hollow body of the second drive transmitter, and a link body configured to link the first inserting body and the second inserting body;

a releasing device configured to relatively move the link device to the second drive transmitter in an axial direction and release a link of a driving force between a rotary body and a housing of an image forming apparatus; and a phase matching device configured to match a phase in a direction of rotation of the first drive transmitter and a phase in a direction of rotation of the second drive transmitter, the phase matching device including a first phase matching device configured to match a phase in a direction of rotation of the link device and the phase in the direction of rotation of the first drive transmitter; and a second phase matching device configured to match the phase in the direction of rotation of the link device and the phase in the direction of rotation of the second drive transmitter, wherein the first drive transmitter has a groove formed in an inner peripheral surface of the first hollow body in which the projection of the first inserting body of the link device moves in an axial direction, wherein the second drive transmitter has a groove formed in an inner peripheral surface of the second hollow body in which the projection of the second inserting body of the link device moves in the axial direction, wherein the second drive transmitter being disposed at an end portion of a shaft of a rotary body detachably attached to the housing of the image forming apparatus, wherein at least one of the first phase matching device and the second phase matching device includes:

a phase matching projection protruding in the radial direction from the peripheral surface of a respective one of the first inserting body and the second inserting body; and a phase matching guide groove, into which the phase matching projection of the respective one of the first inserting body and the second inserting body is inserted, when the respective one of the first inserting body and the second inserting body is inserted into a corresponding one of the first hollow body of the first drive transmitter and the second hollow body of the second drive transmitter, wherein the phase matching projection has a shape different from the projection, wherein the phase matching guide groove has a shape different from the groove into which the projection is inserted when the respective one of the first inserting body and the second inserting body is inserted into the corresponding one of the first hollow body of the first drive transmitter and the second hollow body of the second drive transmitter, and wherein the phase matching projection is inserted into the phase matching groove.

8. A drive transmission device comprising:
a first drive transmitter having a first hollow body in a rotation center;
a second drive transmitter having a second hollow body in a rotation center;
a link device configured to link the first drive transmitter and the second drive transmitter, the link device including,
  a first inserting body having a spherical shape and a peripheral surface on which a projection protruding in a radial direction is formed, the first inserting body configured to be inserted into the first hollow body of the first drive transmitter,
  a second inserting body having a spherical shape and a peripheral surface on which a projection protruding in a radial direction is formed, the second inserting body configured to be inserted into the second hollow body of the second drive transmitter, and
  a link body configured to link the first inserting body and the second inserting body;
a releasing device configured to relatively move the link device to the second drive transmitter in an axial direction and release a link of a driving force between a rotary body and a housing of an image forming apparatus; and
a phase matching device configured to match a phase in a direction of rotation of the first drive transmitter and a phase in a direction of rotation of the second drive transmitter, the phase matching device including a first phase matching device configured to match a phase in a direction of rotation of the link device and the phase in the direction of rotation of the first drive transmitter; and a second phase matching device configured to match the phase in the direction of rotation of the link device and the phase in the direction of rotation of the second drive transmitter,
wherein the first drive transmitter has a groove formed in an inner peripheral surface of the first hollow body in which the projection of the first inserting body of the link device moves in an axial direction,
wherein the second drive transmitter has a groove formed in an inner peripheral surface of the second hollow body in which the projection of the second inserting body of the link device moves in the axial direction,
wherein the second drive transmitter being disposed at an end portion of a shaft of a rotary body detachably attached to the housing of the image forming apparatus, and
wherein at least one of the first phase matching device and the second phase matching device includes:
  a projection portion protruding in the axial direction and located in a position shifted from a rotation center of a bottom surface of one of the first hollow body of the first drive transmitter and the second hollow body of the second drive transmitter, and
  a cut portion formed in a respective one of the first inserting body and the second inserting body such that the respective one of the first inserting body and the second inserting body is not in contact with the projection portion when the respective one of the first inserting body and the second inserting body is inserted into the one of the first hollow body of the first drive transmitter and the second hollow body of the second drive transmitter.

9. The drive transmission device according to claim 1, wherein the first drive transmitter includes:
a stopper disposed in the groove and configured to stop the projection from being detached from the groove;
a hollow body formed in the first hollow body and formed at a position different from a position of the groove in a direction of rotation of the first drive transmitter;
a guide groove configured to extend in the axial direction and guide the projection into the first hollow body when the first inserting body is inserted into the first hollow body, and
a communicating portion configured to cause the guide groove and the groove to communicate with each other.

10. The drive transmission device according to claim 9, wherein the projection includes a regulator configured to regulate movement of the projection from the groove to the guide groove through the communicating portion.

11. The drive transmission device according to claim 1, wherein the projection has a groove abutting portion to which the projection contacts the groove while the driving force is transmitted to the rotary body, and
wherein the groove abutting portion is formed projecting in a direction of rotation of the link device and linearly extending in a radial direction of the link device.

12. An image forming apparatus comprising:
the drive transmission device according to claim 1, configured to transmit the driving force generated by a drive motor to the rotary body; and
the rotary body having a shaft.

13. The image forming apparatus according to claim 12, wherein the rotary body is detachably attached to the shaft of the rotary body in a direction perpendicular to the shaft of the rotary body.

* * * * *